United States Patent
Gainey, Jr. et al.

(10) Patent No.: US 11,023,256 B2
(45) Date of Patent: *Jun. 1, 2021

(54) ARCHITECTURAL MODE CONFIGURATION

(71) Applicant: INTERNATIONAL BUSINESS MACHINES CORPORATION, Armonk, NY (US)

(72) Inventors: Charles W. Gainey, Jr., Poughkeepsie, NY (US); Michael K. Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 21 days.

This patent is subject to a terminal disclaimer.

(21) Appl. No.: 16/513,034

(22) Filed: Jul. 16, 2019

(65) Prior Publication Data

US 2019/0339995 A1    Nov. 7, 2019

Related U.S. Application Data

(63) Continuation of application No. 15/455,198, filed on Mar. 10, 2017, now Pat. No. 10,552,175, which is a (Continued)

(51) Int. Cl.
*G06F 9/4401* (2018.01)
*G06F 9/445* (2018.01)
(Continued)

(52) U.S. Cl.
CPC ...... *G06F 9/44505* (2013.01); *G06F 9/30076* (2013.01); *G06F 9/30189* (2013.01);
(Continued)

(58) Field of Classification Search
CPC .................................................. G06F 9/44505
See application file for complete search history.

(56) References Cited

U.S. PATENT DOCUMENTS

| 5,212,777 A | 5/1993 | Gove |
| 5,551,013 A | 8/1996 | Beausoleil et al. |

(Continued)

FOREIGN PATENT DOCUMENTS

| CN | 101021794 A | 8/2007 |
| CN | 102955713 A | 3/2013 |

(Continued)

OTHER PUBLICATIONS

"System /370 Extended Architecture/Interpretive Execution," IBM Publication No. SA22-7095-01, Sep. 1985, pp. 1-32.
(Continued)

*Primary Examiner* — Kim Huynh
*Assistant Examiner* — Eric Chang
(74) *Attorney, Agent, or Firm* — Steven Chiu, Esq.; Blanche E. Schiller, Esq.; Heslin Rothenberg Farley & Mesiti P.C.

(57) ABSTRACT

A determination is made that a configuration architectural mode facility is installed in a computing environment that is configured for a plurality of architectural modes and has a defined power-on sequence that is to power-on the computing environment in one architectural mode of the plurality of architectural modes. Based on determining that the configuration architectural mode facility is installed, the computing environment is reconfigured to restrict use of the one architectural mode. The reconfiguring includes selecting a different power-on sequence to power-on the computing environment in other architectural mode of the plurality of architectural modes, wherein the other architectural mode is different from the one architectural mode, and executing the different power-on sequence to power-on the computing environment in the other architectural mode in place of the one architectural mode restricting use of the one architectural mode.

9 Claims, 27 Drawing Sheets

Related U.S. Application Data continuation of application No. 14/554,806, filed on Nov. 26, 2014, now Pat. No. 9,594,576, which is a continuation of application No. 14/217,840, filed on Mar. 18, 2014, now Pat. No. 9,582,295.

(51) Int. Cl.
  *G06F 15/76* (2006.01)
  *G06F 15/78* (2006.01)
  *G06F 9/30* (2018.01)
(52) U.S. Cl.
  CPC .......... *G06F 9/4403* (2013.01); *G06F 9/4405* (2013.01); *G06F 15/76* (2013.01); *G06F 15/7867* (2013.01)

(56) References Cited

U.S. PATENT DOCUMENTS

| | | |
|---|---|---|
| 5,574,873 A | 11/1996 | Davidian |
| 5,638,525 A | 6/1997 | Hammond |
| 5,740,461 A | 4/1998 | Jaggar |
| 5,790,825 A | 8/1998 | Traut |
| 6,009,261 A | 12/1999 | Scalzi et al. |
| 6,199,202 B1 | 3/2001 | Coutant et al. |
| 6,308,255 B1 | 10/2001 | Gorishek, IV et al. |
| 6,463,582 B1 | 10/2002 | Lethin et al. |
| 6,496,971 B1 | 12/2002 | Lesea |
| 7,058,791 B1 | 6/2006 | Hughes |
| 7,159,102 B2 | 1/2007 | Irie et al. |
| 7,260,702 B2 | 8/2007 | Vega |
| 7,406,682 B2 | 7/2008 | Todd et al. |
| 7,409,537 B2 | 8/2008 | Tsang |
| 7,496,495 B2 | 2/2009 | Solomon et al. |
| 7,562,349 B2 | 7/2009 | Fleischer et al. |
| 7,596,705 B2 | 9/2009 | Kim |
| 7,647,589 B1 | 1/2010 | Dobrovolskiy et al. |
| 7,783,867 B2 | 8/2010 | Bohizic et al. |
| 7,821,849 B2 | 10/2010 | Oberlaender |
| 8,001,549 B2 | 8/2011 | Hemni |
| 8,024,730 B2 | 9/2011 | Cambell |
| 8,117,417 B2 | 2/2012 | Greiner et al. |
| 8,301,865 B2 | 10/2012 | Grohoski et al. |
| 8,364,912 B2 | 1/2013 | Farrell et al. |
| 8,458,709 B2 | 6/2013 | Armstrong |
| 8,479,172 B2 | 7/2013 | Duale et al. |
| 8,504,703 B2 | 8/2013 | Vega |
| 8,806,182 B2 | 8/2014 | Rymarczyk et al. |
| 9,047,078 B2 | 6/2015 | Greiner |
| 9,092,215 B2 | 7/2015 | Grisenthwaite et al. |
| 9,141,810 B2 | 9/2015 | O'Connor |
| 9,582,295 B2 | 2/2017 | Gainey et al. |
| 9,588,774 B2 | 3/2017 | Gschwind |
| 9,594,576 B2 | 3/2017 | Gainey et al. |
| 9,600,292 B2 | 3/2017 | Gschwind |
| 9,916,185 B2 | 3/2018 | Gainey et al. |
| 9,916,186 B2 | 3/2018 | Gainey et al. |
| 9,921,848 B2 | 3/2018 | Bradbury |
| 10,241,910 B2 | 3/2019 | Greiner |
| 10,552,175 B2 | 2/2020 | Gainey |
| 2005/0114555 A1 | 5/2005 | Errickson et al. |
| 2005/0223225 A1 | 10/2005 | Campbell et al. |
| 2005/0240753 A1 | 10/2005 | Zimmer |
| 2006/0075218 A1 | 4/2006 | Barragy |
| 2007/0028075 A1 | 2/2007 | Holder et al. |
| 2008/0093277 A1 | 4/2008 | Armour |
| 2009/0182971 A1 | 7/2009 | Greiner |
| 2009/0210874 A1 | 8/2009 | Harris |
| 2011/0035725 A9 | 2/2011 | Naik et al. |
| 2011/0179254 A1 | 7/2011 | Yip |
| 2011/0320773 A1 | 12/2011 | Greiner et al. |
| 2011/0320825 A1 | 12/2011 | Greiner et al. |
| 2012/0260064 A1 | 10/2012 | Henry et al. |
| 2012/0260071 A1 | 10/2012 | Henry |
| 2012/0278592 A1 | 11/2012 | Tran |
| 2012/0297180 A1 | 11/2012 | Teng et al. |
| 2013/0024659 A1 | 1/2013 | Farrell et al. |
| 2013/0054955 A1 | 2/2013 | Oh |
| 2013/0138907 A1 | 5/2013 | Farrell et al. |
| 2013/0191832 A1 | 7/2013 | Busaba |
| 2013/0232331 A1 | 9/2013 | Farhan |
| 2013/0305023 A1 | 11/2013 | Gainey et al. |
| 2013/0339975 A1 | 12/2013 | Busaba et al. |
| 2014/0101361 A1 | 4/2014 | Gschwind et al. |
| 2014/0122943 A1 | 5/2014 | Henry |
| 2014/0351563 A1 | 11/2014 | Vorbach |
| 2015/0268965 A1 | 9/2015 | Gainey et al. |
| 2015/0268966 A1 | 9/2015 | Gainey et al. |
| 2015/0268972 A1 | 9/2015 | Gainey et al. |
| 2015/0269004 A1 | 9/2015 | Gainey et al. |
| 2015/0269085 A1 | 9/2015 | Gainey et al. |
| 2015/0269117 A1 | 9/2015 | Gainey et al. |
| 2015/0277923 A1 | 10/2015 | Bradbury |
| 2015/0303975 A1 | 10/2015 | Calhoun |
| 2017/0124023 A1 | 5/2017 | Gainey et al. |
| 2017/0185430 A1 | 6/2017 | Gainey et al. |
| 2018/0081735 A1 | 3/2018 | Gainey et al. |
| 2018/0081736 A1 | 3/2018 | Gainey et al. |
| 2019/0339994 A1 | 11/2019 | Gainey et al. |

FOREIGN PATENT DOCUMENTS

| | | |
|---|---|---|
| JP | S60254358 A | 12/1985 |
| JP | H02135528 A | 5/1990 |
| JP | H0447853 B2 | 8/1992 |
| JP | H06332803 A | 12/1994 |
| JP | 2007207074 A | 8/2007 |
| RU | 2294010 C1 | 2/2007 |
| RU | 2444783 C2 | 3/2012 |
| RU | 2374675 C2 | 11/2019 |
| WO | WO2008083277 A1 | 7/2008 |

OTHER PUBLICATIONS

"z/Architecture—Principles of Operation," Publication No. SA22-7832-09, 10th Edition, Sep. 2012, pp. 1-1568.
"z/VM The Very Basics," downloaded from internet Mar. 11, 2014, wwwlgis.informatik.uni-kl.de, pp. 1-26.
Anonymous, "Traffic Translator to Maximize Bandwidth of Legacy IP's on AXI," IPCOM000215484D, Mar. 2012, 9 pages.
Gregg, Thomas A., et al., "Overview of IBM zEnterprise 196 Subsystem with Focus on New PCI Express Infrastructure," IBM Journal of Research and Development, vol. 56, No. 1/2, Jan./Mar. 2012, pp. 8:1-8:14.
Johansen, Klaus, "Availability and Performance Aspects for Mainframe Consolidated Servers," PhD diss., Master's Thesis, Technical University of Denmark, DTU, Sep. 2007, 144 pages.
Mawatari, M. et al. "464XLAT: Combination of Stateful and Stateless Translation," IPCOM000226417, Apr. 2013, 29 pages.
Mell, Peter and Tim Grance, "The NIST Definition of Cloud Computing," National Institute of Standards and Technology, Information Technology Laboratory, Version 15, Oct. 7, 2009, pp. 1-2.
Osisek, et al., "ESA/390 interpretive-execution architecture, foundation for VM/ESA," IBM Systems Journal, vol. 30, No. 1, Jan. 1991, pp. 34-51.
Plambeck et al., "Development and Attributes of z/Architecture," IBM Journal of Research and Development, vol. 46, No. 4/5, Jul./Sep. 2002, pp. 367-379.
z/VM: Running Guest Operating Systems, IBM® Publication No. SC24-5997-02, Oct. 2001, pp. 1-179.
International Search Report for PCT/EP2015/053638 dated May 4, 2015, pp. 1-11.
International Search Report for PCT/EP2015/054841 dated Jun. 3, 2015, pp. 1-10.
International Search Report for PCT/EP2015/054850 dated May 28, 2015, pp. 1-18.
IBM Redbooks et al., "IBM eServer zSeries 900 Technical Guide," Sep. 2002, pp. 233, 234 & 236.
Gainey, Jr., et al., "Architectural Mode Configuration," U.S. Appl. No. 16/512,987, filed Jul. 16, 2019, pp. 1-112.

ARCHITECTURAL MODE CONFIGURATION

This application is a continuation of co-pending U.S. patent application Ser. No. 15/455,198, filed Mar. 10, 2017, entitled "ARCHITECTURAL MODE CONFIGURATION," which is a continuation of U.S. Pat. No. 9,594,576, issued Mar. 14, 2017, entitled "ARCHITECTURAL MODE CONFIGURATION," which is a continuation of U.S. Pat. No. 9,582,295, issued Feb. 28, 2017, entitled "ARCHITECTURAL MODE CONFIGURATION," each of which is hereby incorporated herein by reference in its entirety.

BACKGROUND

One or more aspects relate, in general, to configurations of computing environments, and in particular, to altering the configurations of such environments.

Computing environments offer a range of capabilities and functions depending on the architectural configurations of the environments. Two architectures that have been offered by International Business Machines Corporation, Armonk, N.Y., include ESA/390 and z/Architecture.

ESA/390 is a predecessor architecture to z/Architecture. However, when z/Architecture was introduced, ESA/390 continued to be supported. To support both architectures in one environment, certain procedures are followed. For instance, in power-up, ESA/390 is booted, and then, a switch may be made to the z/Architecture, if desired. This allowed legacy software to continue executing without a change. Other such procedures are provided in order to support both architectural configurations in one environment.

SUMMARY

Shortcomings of the prior art are overcome and advantages are provided through the provision of a method of reconfiguring a computing environment. The method includes determining that a configuration architectural mode facility is installed in a computing environment that is configured for a plurality of architectural modes and has a defined power-on sequence that is to power-on the computing environment in one architectural mode of the plurality of architectural modes, the one architectural mode including a first instruction set architecture and having a first set of supported features. Based on determining that the configuration architectural mode facility is installed, the computing environment is reconfigured, by a processor, to restrict use of the one architectural mode. The reconfiguring includes: selecting a different power-on sequence to power-on the computing environment in another architectural mode of the plurality of architectural modes, wherein the other architectural mode is different from the one architectural mode, and the other architectural mode includes a second instruction set architecture and having a second set of supported features; and executing the different power-on sequence to power-on the computing environment in the other architectural mode in place of the one architectural mode restricting use of the one architectural mode.

Computer program products and systems relating to one or more embodiments are also described and may be claimed herein. Further, services relating to one or more embodiments are also described and may be claimed herein.

Additional features and advantages are realized. Other embodiments and aspects are described in detail herein and are considered a part of the claimed invention.

BRIEF DESCRIPTION OF THE DRAWINGS

One or more aspects are particularly pointed out and distinctly claimed as examples in the claims at the conclusion of the specification. The foregoing and other objects, features, and advantages are apparent from the following detailed description taken in conjunction with the accompanying drawings in which:

DETAILED DESCRIPTION

In accordance with one aspect, a capability is provided that restricts use of a configuration by a computing environment configured to support multiple configurations, such that one or more aspects of the restricted configuration are unavailable for use. As one example, a processor is configured in a configuration architectural mode (CAM). In CAM, a computing environment (e.g., a processor, a logical partition, a guest), which is originally configured for a plurality of architectures, e.g., a legacy architecture and an enhanced architecture, is re-configured such that one or more aspects of at least one of the architectures, such as the legacy architecture, is no longer supported. In such a configuration, the unsupported aspects of the architecture are not available.

As one particular example, a Configuration z/Architecture Architectural Mode (CZAM) facility is provided in computing environments that support multiple architectures, such as ESA/390 and z/Architecture, which removes the ability to use aspects of ESA/390. Instead, z/Architecture (and/or other architectures, in other embodiments other than ESA/390) is used. CZAM may apply to a native machine, a logical partition, and/or a virtual guest, as examples.

Figure 1A:
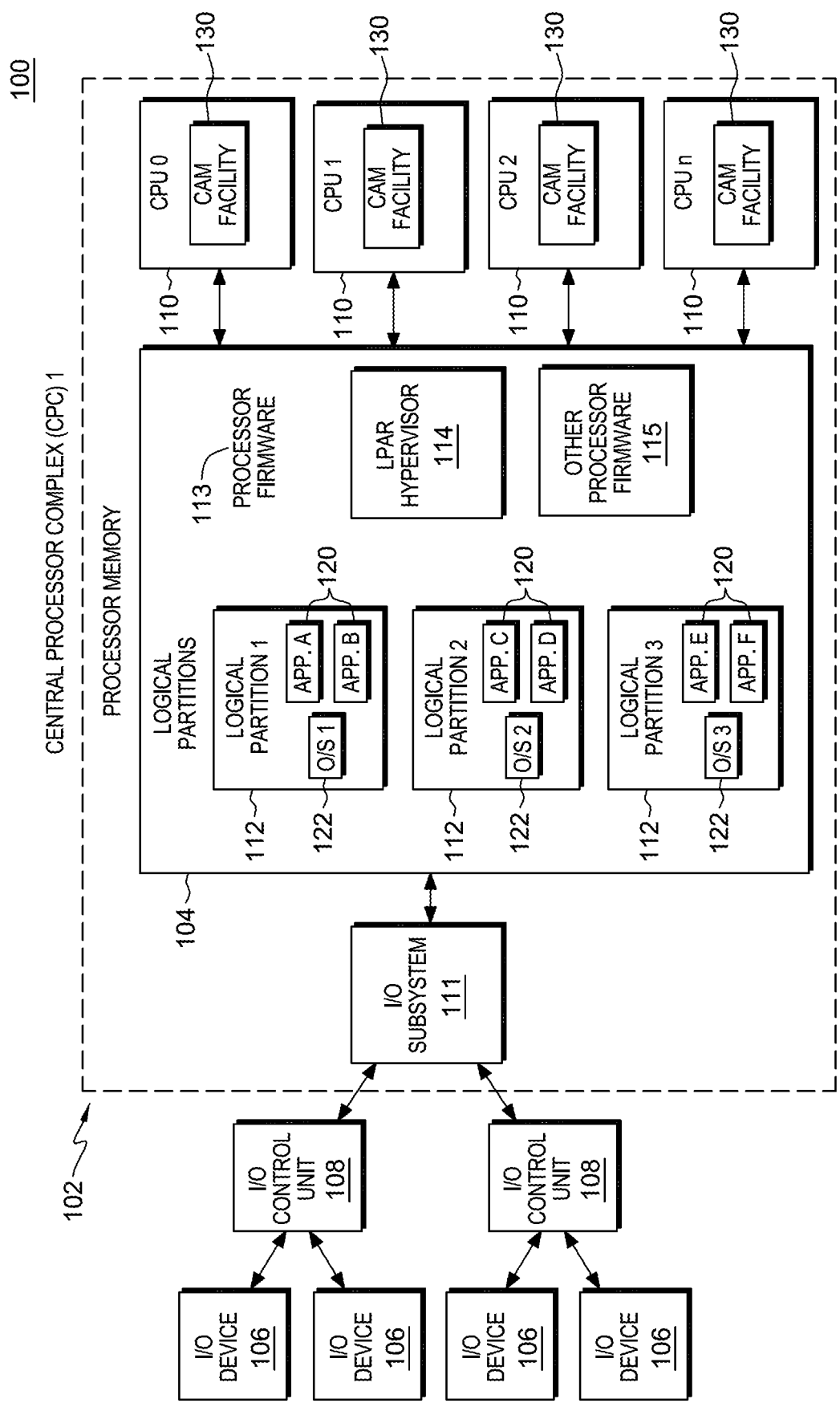
FIG. 1A depicts one example of a computing environment to incorporate and use one or more aspects of a configuration architectural mode facility.

One example of a computing environment to incorporate and use one or more aspects of the configuration architectural mode facility is described with reference to FIG. 1A. Referring to FIG. 1A, in one example, a computing environment 100 is based on the z/Architecture, offered by International Business Machines (IBM®) Corporation, Armonk, N.Y. The z/Architecture is described in an IBM Publication entitled "z/Architecture—Principles of Operation," Publication No. SA22-7932-09, 10$^{th}$ Edition, September 2012, which is hereby incorporated by reference herein in its entirety. Although the computing environment is based on the z/Architecture, in one embodiment, it also supports one or more other architectural configurations, such as ESA/390. Z/ARCHITECTURE, IBM, Z/VM and Z/OS (referenced below) are registered trademarks of International Business Machines Corporation, Armonk, N.Y. Other names used herein may be registered trademarks, trademarks or product names of International Business Machines Corporation or other companies.

As one example, computing environment 100 includes a central processor complex (CPC) 102 coupled to one or more input/output (I/O) devices 106 via one or more control units 108. Central processor complex 102 includes, for instance, a processor memory 104 (a.k.a., main memory, main storage, central storage) coupled to one or more central processors (a.k.a., central processing units (CPUs)) 110, and an input/output subsystem 111, each of which is described below.

Processor memory 104 includes, for example, one or more partitions 112 (e.g., logical partitions), and processor firmware 113, which includes a logical partition hypervisor 114 and other processor firmware 115. One example of logical partition hypervisor 114 is the Processor Resource/System Manager (PRISM), offered by International Business Machines Corporation, Armonk, N.Y.

A logical partition functions as a separate system and has one or more applications 120, and optionally, a resident operating system 122 therein, which may differ for each logical partition. In one embodiment, the operating system is the z/OS operating system, the z/VM operating system, the z/Linux operating system, or the TPF operating system, offered by International Business Machines Corporation, Armonk, N.Y. Logical partitions 112 are managed by logical partition hypervisor 114, which is implemented by firmware running on processors 110. As used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Central processors 110 are physical processor resources allocated to the logical partitions. In particular, each logical partition 112 has one or more logical processors, each of which represents all or a share of a physical processor 110 allocated to the partition. The logical processors of a particular partition 112 may be either dedicated to the partition, so that the underlying processor resource 110 is reserved for that partition; or shared with another partition, so that the underlying processor resource is potentially available to another partition. In one example, one or more of the CPUs include aspects of a configuration architectural mode facility 130 described herein.

Input/output subsystem 111 directs the flow of information between input/output devices 106 and main storage 104. It is coupled to the central processing complex, in that it can be a part of the central processing complex or separate therefrom. The I/O subsystem relieves the central processors of the task of communicating directly with the input/output devices and permits data processing to proceed concurrently with input/output processing. To provide communications, the I/O subsystem employs I/O communications adapters. There are various types of communications adapters including, for instance, channels, I/O adapters, PCI cards, Ethernet cards, Small Computer Storage Interface (SCSI) cards, etc. In the particular example described herein, the I/O communications adapters are channels, and therefore, the I/O subsystem is referred to herein as a channel subsystem. However, this is only one example. Other types of I/O subsystems can be used.

The I/O subsystem uses one or more input/output paths as communication links in managing the flow of information to or from input/output devices 106. In this particular example, these paths are called channel paths, since the communication adapters are channels.

Figure 1B:
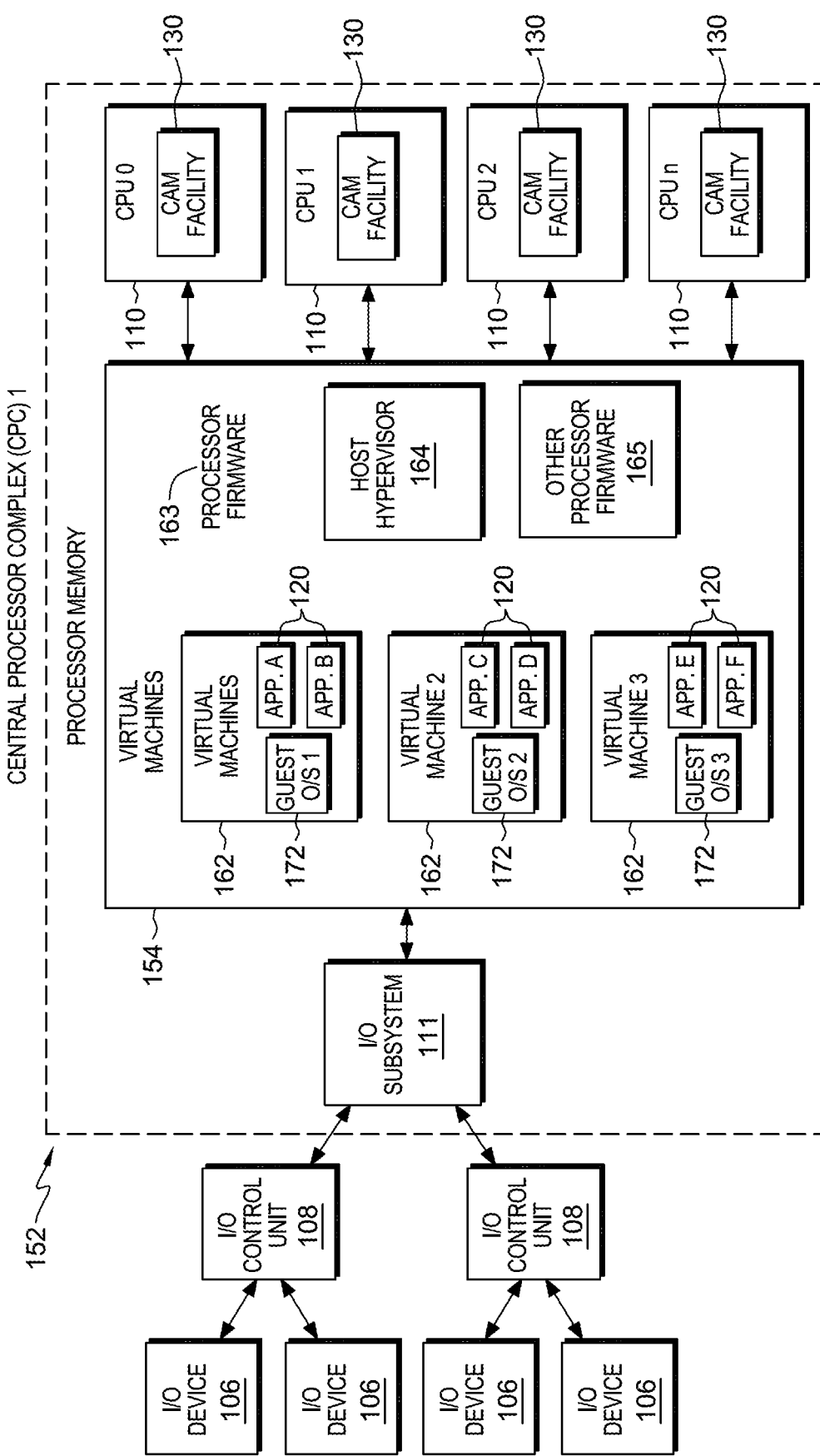
FIG. 1B depicts one example of a virtual computing environment to incorporate and use one or more aspects of a configuration architectural mode facility.

Another example of a computing environment to incorporate and use one or more aspects of the CAM facility is described with reference to FIG. 1B. In this example, a computing environment 150 includes a central processor complex 152 providing virtual machine support. CPC 152 is coupled to one or more input/output (I/O) devices 106 via one or more control units 108. Central processor complex 152 includes, for instance, a processor memory 154 (a.k.a., main memory, main storage, central storage) coupled to one or more central processors (a.k.a., central processing units (CPUs)) 110, and an input/output subsystem 111.

Processor memory 154 includes, for example, one or more virtual machines 162, and processor firmware 163, which includes a host hypervisor 164 and other processor firmware 165. One example of host hypervisor 164 is z/VM®, offered by International Business Machines Corporation, Armonk, N.Y.

The virtual machine support of the CPC provides the ability to operate large numbers of virtual machines 162, each capable of hosting a guest operating system 172, such as Linux. Each virtual machine 162 is capable of functioning as a separate system. That is, each virtual machine can be independently reset, host a guest operating system, and operate with different programs 120. An operating system or application program running in a virtual machine appears to have access to a full and complete system, but in reality, only a portion of it is available.

In this particular example, the model of virtual machines is a V=V model, in which the absolute or real memory of a virtual machine is backed by host virtual memory, instead of real or absolute memory. Each virtual machine has a virtual linear memory space. The physical resources are owned by host 164, and the shared physical resources are dispatched by the host to the guest operating systems, as needed, to meet their processing demands. This V=V virtual machine (i.e., pageable guest) model assumes that the interactions between the guest operating systems and the physical shared machine resources are controlled by the host, since the large number of guests typically precludes the host from simply partitioning and assigning the hardware resources to the configured guests. One or more aspects of a V=V model are further described in an IBM® publication entitled "z/VM: Running Guest Operating Systems," IBM® Publication No. SC24-5997-02, October 2001, which is hereby incorporated by reference herein in its entirety.

Central processors 110 are physical processor resources that are assignable to a virtual machine. For instance, virtual machine 162 includes one or more logical processors, each of which represents all or a share of a physical processor resource 110 that may be dynamically allocated to the virtual machine. Virtual machines 162 are managed by host 164.

In one embodiment, the host (e.g., z/VM®) and processor (e.g., System z) hardware/firmware interact with each other in a controlled cooperative manner in order to process V=V guest operating system operations without requiring transfer of control from/to the guest operating system and the host. Guest operations can be executed directly without host intervention via a facility that allows instructions to be interpretively executed for a pageable storage mode guest. This facility provides an instruction, Start Interpretive Execution (SIE), which the host can issue, designating a control block called a state description which holds guest (virtual machine) state and controls, such as execution controls and mode controls. The instruction places the machine into an interpretive-execution mode in which guest instructions and interruptions are processed directly, until a condition requiring host attention arises. When such a condition occurs, interpretive execution is ended, and either a host interruption is presented, or the SIE instruction completes storing details of the condition encountered; this latter action is called interception. One example of interpretive execution is described in System/370 Extended Architecture/Interpretive Execution, IBM Publication No. SA22-7095-01, September 1985, which is hereby incorporated by reference herein in its entirety.

In particular, in one embodiment, the interpretative execution facility provides an instruction for the execution of virtual machines. This instruction, called Start Interpretative Execution (SIE), is issued by a host which establishes a guest execution environment. The host is the control program directly managing the real machine and a guest refers to any virtual or interpreted machine. The machine is placed in the interpretative execution mode by the host, which issues the SIE instruction. In this mode, the machine provides the functions of a selected architecture (e.g., z/Architecture, ESA/390). The functions include, for instance, execution of privileged and problem program instructions, address translation, interruption handling, and timing among other things. The machine is said to interpret the functions that it executes in the context of the virtual machine.

The SIE instruction has an operand, called the state description, which includes information relevant to the current state of the guest. When execution of SIE ends, information representing the state of the guest, including the guest PSW is saved in the state description before control is returned to the host.

The interpretative execution architecture provides a storage mode for absolute storage referred to as a pageable storage mode. In pageable storage mode, dynamic address translation at the host level is used to map guest main storage. The host has the ability to scatter the real storage of pageable storage mode guests to usable frames anywhere in host real storage by using the host DAT, and to page guest data out to auxiliary storage. This technique provides flexibility when allocating real machine resources while preserving the expected appearance of a contiguous range of absolute storage for the guest.

A virtual machine environment may call for application of DAT twice: first at the guest level, to translate a guest virtual address through guest managed translation tables into a guest real address, and then, for a pageable guest, at the host level, to translate the corresponding host virtual address to a host real address.

In certain cases, the host is to intercede in operations normally delegated to the machine. For this purpose, the state description includes controls settable by the host to "trap," or intercept, specific conditions. Interception control bits request that the machine return control to host simulation when particular guest instructions are encountered. Intervention controls capture the introduction of an enabled state into the PSW, so that the host can present an interruption which it holds pending for the guest. Intervention controls may be set asynchronously by the host on another real processor while interpretation proceeds. The machine periodically refetches the controls from storage, so that updated values will be recognized. Guest interruptions can thereby be made pending without prematurely disturbing interpretation.

In one embodiment, mode controls in the state description specify whether the guest is executed in the ESA/390 or z/Architecture mode and selects one of a plurality of ways to represent guest main storage of a guest virtual machine in host storage. In accordance with one embodiment, a control bit is provided in a state control to select between a guest in a first and a second architectural mode (e.g., z/Architecture and ESA/390, respectively). In accordance with another embodiment, two distinct instructions may provide a host with the ability to create a first and a second guest virtual machine, e.g., distinct instructions SIEz and SIEe may be provided to start guest machines in a z/Architecture and ESA/390 mode, respectively.

The SIE instruction runs a virtual server dispatched by the control program until the server's time slice has been consumed or until the server wants to perform an operation that the hardware cannot virtualize or for which the control program is to regain control. At that point, the SIE instruction ends and control is returned to the control program, which either simulates the instruction or places the virtual server in an involuntary wait state. When complete, the control program again schedules the virtual server to run, and the cycle starts again. In this way, the full capabilities and speed of the CPU are available to the virtual server. Only those privileged instructions that require assistance from or validation by the control program are intercepted. These SIE intercepts, as they are known as, are also used by the control program to impose limits on the operations a virtual server may perform on a real device.

Further details regarding SIE are described in ESA/390 interpretive-execution architecture, foundation for VM/ESA, Osisek et al., IBM Systems Journal, Vol. 30, No.

1, January 1991, pp. 34-51, which is hereby incorporated by reference herein in its entirety.

Figure 2:
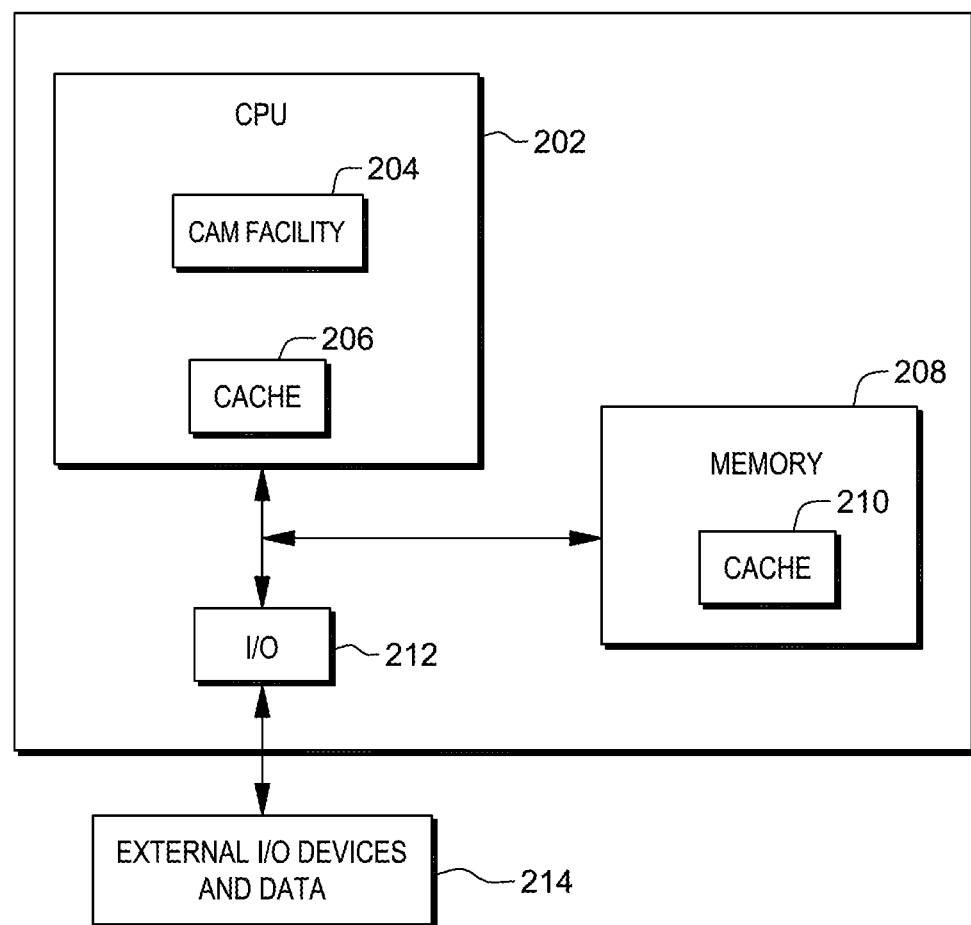
FIG. 2 depicts another example of a computing environment to incorporate and use one or more aspects of a configuration architectural mode facility.

Another example of a computing environment to incorporate and use one or more aspects of the configuration architectural mode facility is described with reference to FIG. 2. In this example, a computing environment 200 includes a non-partitioned environment that is configured for a plurality of architectural modes, including the z/Architecture and ESA/390. It includes, e.g., a processor (central processing unit—CPU) 202 that includes, for instance, a configuration architecture mode facility 204, and one or more caches 206. Processor 202 is communicatively coupled to a memory portion 208 having one or more caches 210, and to an input/output (I/O) subsystem 212. I/O subsystem 212 is communicatively coupled to external I/O devices 214 that may include, for example, data input devices, sensors and/or output devices, such as displays.

Figure 3A:
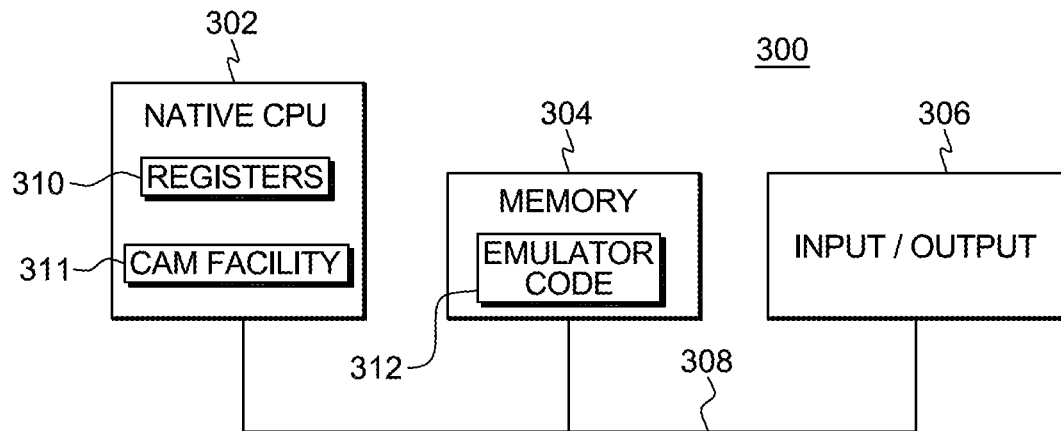
FIG. 3A depicts yet another example of a computing environment to incorporate and use one or more aspects of a configuration architectural mode facility.

Another embodiment of a computing environment to incorporate and use one or more aspects of the configuration architectural mode facility is described with reference to FIG. 3A. In this example, a computing environment 300 includes, for instance, a native central processing unit (CPU) 302, a memory 304, and one or more input/output devices and/or interfaces 306 coupled to one another via, for example, one or more buses 308 and/or other connections. As examples, computing environment 300 may include a PowerPC processor or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 302 includes one or more native registers 310, such as one or more general purpose registers and/or one or more special purpose registers used during processing within the environment, as well as a configuration architectural mode facility 311. These registers include information that represents the state of the environment at any particular point in time.

Moreover, native central processing unit 302 executes instructions and code that are stored in memory 304. In one particular example, the central processing unit executes emulator code 312 stored in memory 304. This code enables the computing environment configured in one architecture to emulate one or more other architectures. For instance, emulator code 312 allows machines based on architectures other than the z/Architecture, such as PowerPC processors, Power Systems servers, HP Superdome servers or others, to emulate the z/Architecture (and/or ESA/390) and to execute software and instructions developed based on the z/Architecture.

Figure 3B:
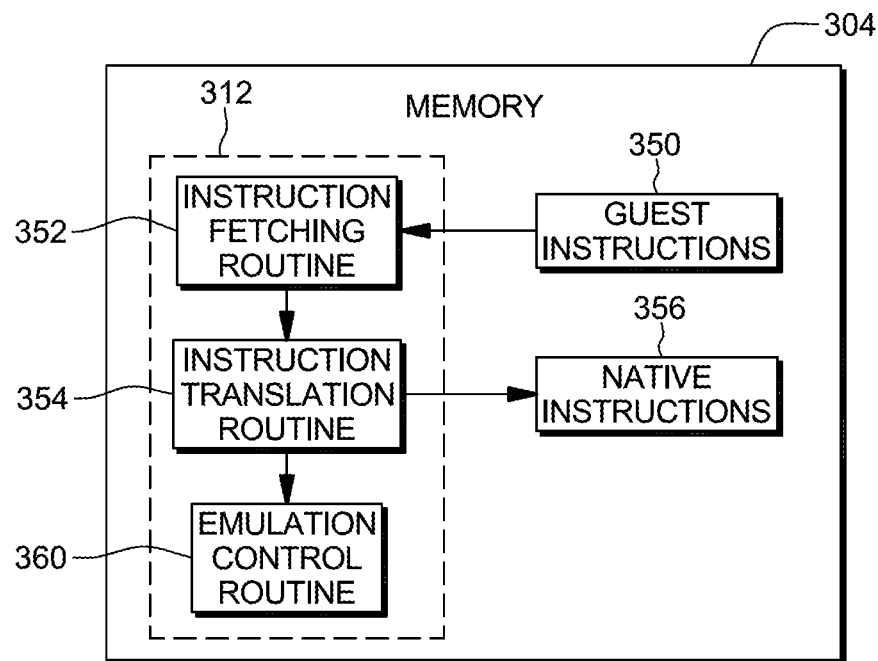
FIG. 3B depicts further details of the memory of FIG. 3A.

Further details relating to emulator code 312 are described with reference to FIG. 3B. Guest instructions 350 stored in memory 304 comprise software instructions (e.g., correlating to machine instructions) that were developed to be executed in an architecture other than that of native CPU 302. For example, guest instructions 350 may have been designed to execute on a z/Architecture processor 202, but instead, are being emulated on native CPU 302, which may be, for example, an Intel Itanium II processor. In one example, emulator code 312 includes an instruction fetching routine 352 to obtain one or more guest instructions 350 from memory 304, and to optionally provide local buffering for the instructions obtained. It also includes an instruction translation routine 354 to determine the type of guest instruction that has been obtained and to translate the guest instruction into one or more corresponding native instructions 356. This translation includes, for instance, identifying the function to be performed by the guest instruction and choosing the native instruction(s) to perform that function.

Further, emulator code 312 includes an emulation control routine 360 to cause the native instructions to be executed. Emulation control routine 360 may cause native CPU 302 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 356 may include loading data into a register from memory 304; storing data back to memory from a register; or performing some type of arithmetic or logic operation, as determined by the translation routine.

Each routine is, for instance, implemented in software, which is stored in memory and executed by native central processing unit 302. In other examples, one or more of the routines or operations are implemented in firmware, hardware, software or some combination thereof. The registers of the emulated processor may be emulated using registers 310 of the native CPU or by using locations in memory 304. In embodiments, guest instructions 350, native instructions 356 and emulator code 312 may reside in the same memory or may be disbursed among different memory devices.

The computing environments described above are only examples of computing environments that can be used. Other environments, including but not limited to, other non-partitioned environments, other partitioned environments, and/or other emulated environments, may be used; embodiments are not limited to any one environment.

In accordance with one or more aspects, a configuration architectural mode (CAM) facility is installed in one or more processors (e.g., central processing units) of a computing environment to control reconfiguration of the environment. For instance, when CAM is installed in a computing environment that supports a plurality of architectural modes, the computing environment is reconfigured such that use of one or more aspects of at least one of the architectural modes is restricted.

One particular example of a configuration architectural mode facility is the Configuration z/Architecture Architectural Mode (CZAM) facility. Installation of CZAM is indicated by, for instance, a facility installation indicator, e.g., bit 138, set to, for instance, one. In one particular example, when bit 138 is set to one, the CZAM facility is installed, and when installed, a normal reset and a clear reset places the configuration into the z/Architecture architectural mode. Thus, the facility bit, e.g., bit 2, indicating the z/Architecture architectural mode is active is also set to one, in one example.

Based on installation of CZAM, a computing environment (e.g., a single processor, a logical partition, a virtual guest, etc.) is re-configured such that one or more aspects of a selected architecture, e.g., ESA/390, is no longer supported. Those aspects that are no longer supported and/or processes affected by installation of CZAM are described below.

Although in the embodiments described herein, the plurality of architectural modes include a legacy architecture (e.g., ESA/390) and an enhanced architecture (e.g., z/Architecture) and aspects of the legacy architecture, ESA/390, are no longer supported, other embodiments may include other architectures. ESA/390 and z/Architecture are only examples.

One process that is affected by installation of CZAM is a power-on process. To describe how this process is affected, initially, a power-on process for an environment that supports multiple architectural configurations and does not include the CZAM facility is described with reference to FIGS. 4A-4B, and then a power-on process for an environment that is configured for multiple architectural configurations and does include the CZAM facility is described with reference to FIGS. 6A-6B. Power-on for a system includes, for instance, starting the system and initiating a boot sequence or other means of initiating operations in the system. It may correspond to a physical power-on, a hardware reset, and/or a virtual power-on (e.g., in an emulated system, a virtual machine or a guest environment).

Figure 4A:
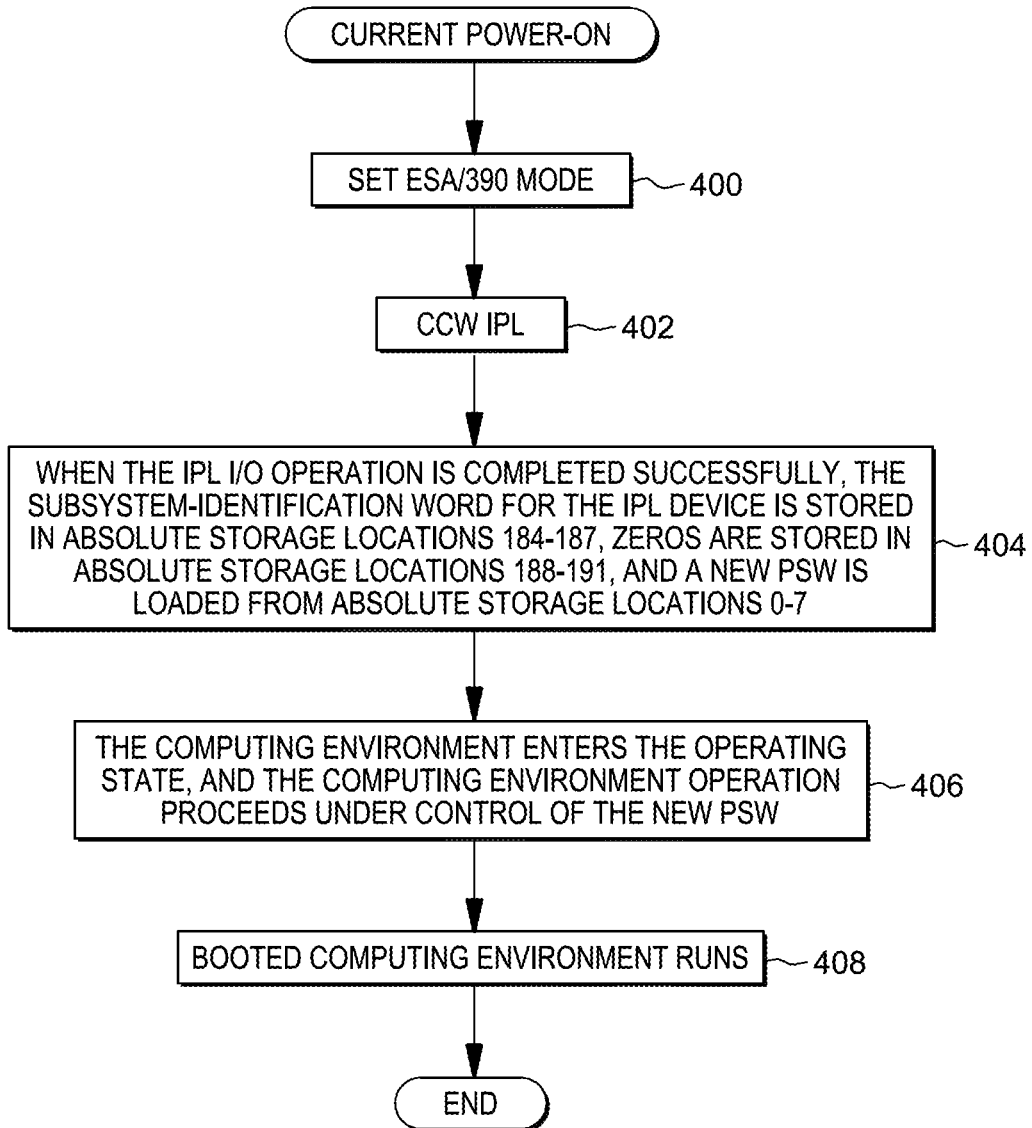
FIG. 4A depicts one embodiment of the logic to power-on a computing environment in one architectural mode.

Referring initially to FIG. 4A, based on a processor of the computing environment being powered on and an operator key, e.g., a load-normal or a load-clear key, being activated, the processor enters a load state and sets the computing environment to a particular architectural mode, e.g., ESA/390 mode, STEP 400. For instance, an initial program load (IPL), such as a channel control word (CCW) initial program load (IPL), is performed, STEP 402. Initial program loading provides a manual means for causing a program to be read from a designated device and for initiating execution of that program. A CCW-type IPL is initiated manually by setting the load-unit-address controls to a four digit number to designate an input device and by subsequently activating the load-clear or load-normal key for a particular CPU.

Activating the load-clear key causes a clear reset to be performed on the configuration; and activating the load-normal key causes an initial CPU reset to be performed on this CPU (the CPU on which the key was activated), a CPU reset to be propagated to all other CPUs in the configuration, and a subsystem reset to be performed on the remainder of the configuration. Activating the load-clear key or the load-normal key sets the architectural mode (e.g., ESA/390).

In the loading part of the operation, after the resets have been performed, this CPU then enters the load state. This CPU does not necessarily enter the stopped state during the execution of the reset operations. The load indicator is on while the CPU is in the load state.

Subsequently, a channel-program read operation is initiated from the I/O device designated by the load-unit-address controls. The effect of executing the channel program is as if a format-0 CCW beginning at absolute storage location 0 specified a read command with the modifier bits zeros, a data address of zero, a byte count of 24, the chain-command and SLI flags ones, and all other flags zeros.

When the IPL input/output operation is completed successfully, a subsystem identification word for the IPL device is stored in selected absolute storage locations (e.g., locations 184-187), zeros are stored in other selected absolute storage locations (e.g., locations 188-191), and a new program status word (PSW) is loaded from selected absolute storage locations (e.g., locations 0-7), STEP 404. The program status word controls operations of the computing environment.

If the PSW loading is successful and no machine malfunctions are detected, this CPU leaves the load state, and the load indicator is turned off. If the rate control is set to the process position, the CPU enters the operating state, and operation of the computing environment proceeds under control of the new program status word (PSW), STEP 406. The booted computing environment then runs, STEP 408, as further described with reference to FIG. 4B.

Figure 4B:
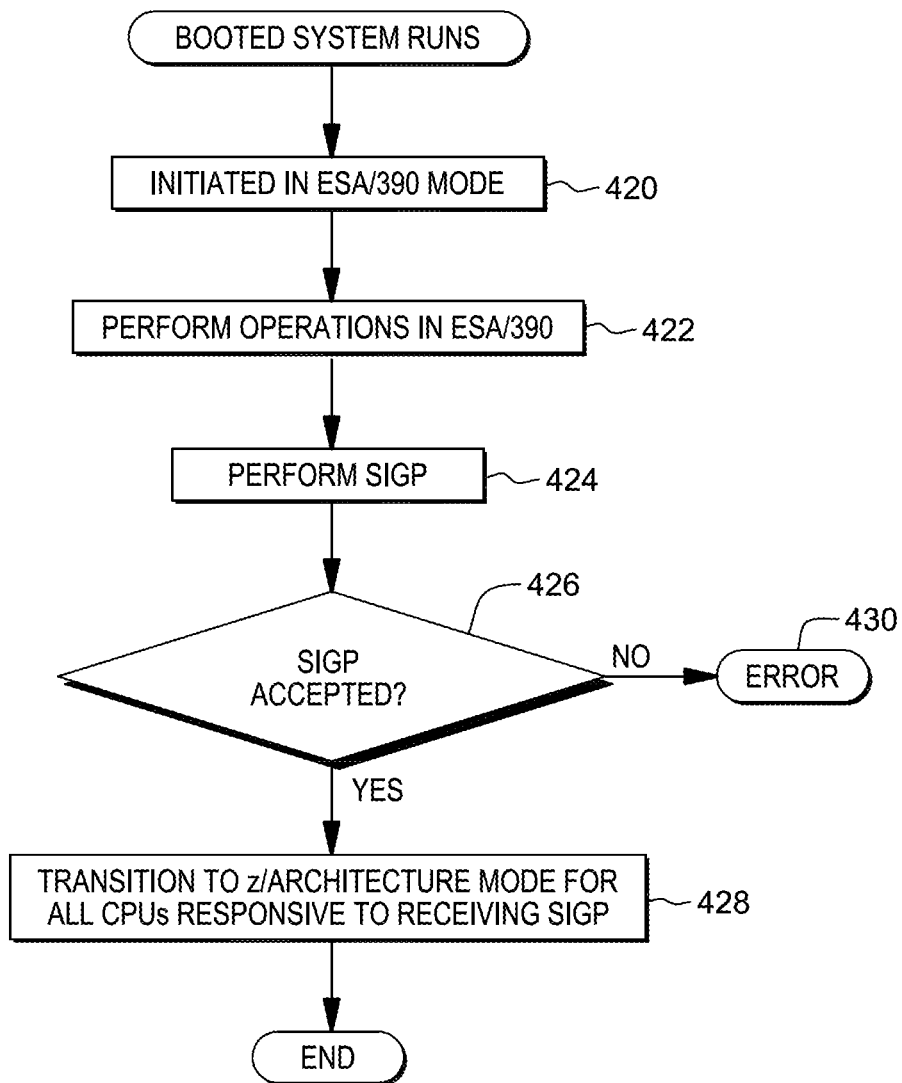
FIG. 4B depicts one embodiment of further processing associated with the power-on process of FIG. 4A.

Referring to FIG. 4B, the booted computing environment is initiated in ESA/390 mode, STEP 420, and thus, operations are performed in ESA/390 mode, STEP 422. At some point, a request may be made to change the architectural mode from ESA/390 to z/Architecture. In particular, a program sends an order code (e.g., a code designating Set Architecture) to the processor, which issues a Signal Processor (SIGP) instruction with the order code to switch from ESA/390 mode to z/Architecture mode, STEP 424. For instance, a CPU signaling and response facility is used that includes the Signal Processor instruction (described below) and a mechanism to interpret and act on server order codes, including one for Set Architecture. The facility provides for communications among CPUs, including transmitting, receiving, and decoding a set of assigned order codes; initiating the specified operation; and responding to a signaling CPU. By using Set Architecture, the architectural mode is set to the desired configuration, e.g., z/Architecture. Further details of this processing are described further below.

Thereafter, a determination is made as to whether the SIGP operation was accepted, INQUIRY 426. Based on the return code, a number of error conditions can be diagnosed, including an "invalid parameter" indication when a determination has been made that the CPU is already in the architectural mode specified by the code (i.e., that the set architecture represents a switch to current mode itself, or whether it is a switch from one mode to another mode). If the SIGP is accepted and the set architecture represents a legal mode switch operation, then all the processors of the computing environment that received the SIGP operation transition into z/Architecture mode using, for instance, the Set Architecture processing described herein, STEP 428. However, if the SIGP operation is not legal, an error is indicated, STEP 430.

As described above, the power-on operation loads a program status word.

Figure 5:
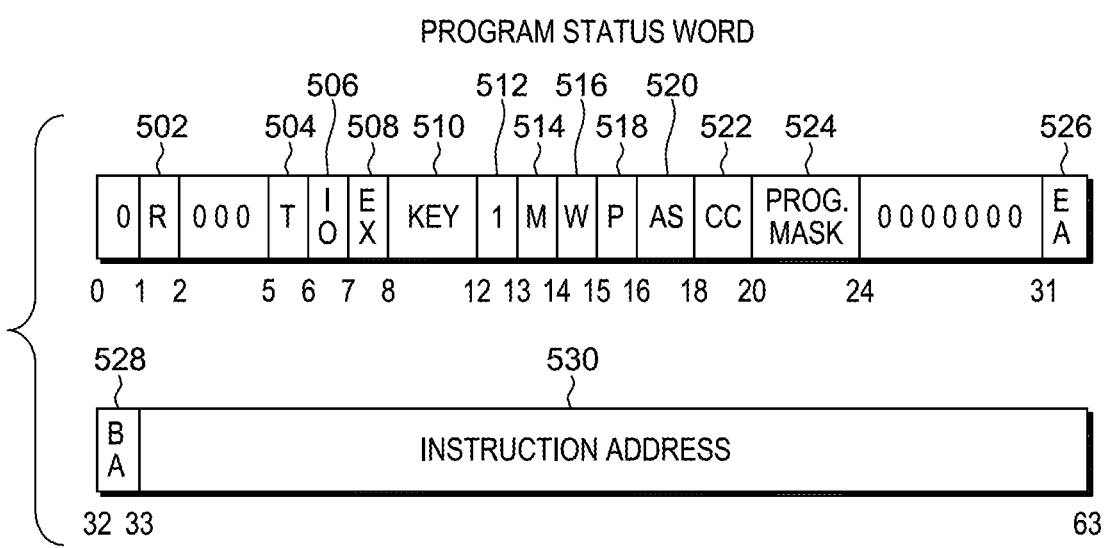
FIG. 5 depicts one embodiment of a format of a program status word.

One embodiment of a format of a program status word (PSW) is described with reference to FIG. 5. Referring to FIG. 5, in this example, the format of the program status word is an ESA/390 format, except that bit 31 is shown as EA, as indicated below.

In one embodiment, a program status word 500 includes the following fields, as one example:

Per Mask (R) 502: Bit 1 controls whether the CPU is enabled for interruptions associated with program event recording (PER). When the bit is zero, no PER event can cause an interruption. When the bit is one, interruptions are permitted, subject to the PER event mask bits in control register 9;

DAT Mode (T) 504: Bit 5 controls whether implicit dynamic address translation (DAT) of logical and instruction addresses used to access storage takes place. When the bit is zero, DAT is off, and logical and instruction addresses are treated as real addresses. When the bit is one, DAT is on, and the dynamic address translation mechanism is invoked.

I/O Mask (10) 506: Bit 6 controls whether the CPU is enabled for I/O interruptions. When the bit is zero, an I/O interruption cannot occur. When the bit is one, I/O interruptions are subject to the I/O interruption subclass mask bits in control register 6. When an I/O interruption subclass mask bit is zero, an I/O interruption for that I/O interruption subclass cannot occur; when the I/O interruption subclass mask bit is one, an I/O interruption for that I/O interruption subclass can occur;

External Mask (EX) 508: Bit 7 controls whether the CPU is enabled for interruption by conditions included in the external class. When the bit is zero, an external interruption cannot occur. When the bit is one, an external interruption is subject to the corresponding external subclass mask bits in control register 0. When the subclass mask bit is zero, conditions associated with the subclass cannot cause an interruption. When the subclass mask bit is one, an interruption in that subclass can occur.

PSW Key (Key) 510: Bits 9-11 form the access key for storage references by the CPU. If the reference is subject to key-controlled protection, the PSW key is matched with a storage key when information is stored or when information is fetched from a location that is protected against fetching. However, for one of the operands of each of Move to Primary, Move to Secondary, Move with Key, Move with Source Key, and Move with Destination Key, and for either or both operands of Move with Optional Specifications, an access key specified as an operand is used instead of the PSW key.

Bit 12 512: This bit indicates the current architectural mode. It is set to one for the ESA/390 PSW format. For the z/Architecture PSW format, this bit is defined to be zero. When in z/Architecture mode, a load PSW extended (LPSWE) instruction is defined for loading a true z/Architecture PSW (which has a different format than the format described herein, including having an instruction address in bits 64-127). However, an ESA/390 load PSW (LPSW) is still supported and can be used to load an ESA/390 format PSW. When LPSW is executed and the computing environment is in z/Architecture mode, the processor expands the ESA/390 format PSW to the z/Architecture format, including inverting bit 12. This is the reverse of collapsing the z/Architecture PSW format that the operating system performs to create the ESA/390 format PSW. That is, in computing environments that support both ESA/390 and z/Architecture, when a copy of a PSW is placed in storage, the operating system collapses the full z/Architecture PSW to the size and format of an ESA/390 PSW. Thus, other software with PSW format dependencies can be unaware of the z/Architecture PSW.

Machine Check Mask (M) 514: Bit 13 controls whether the CPU is enabled for interruption by machine check conditions. When the bit is zero, a machine check interruption cannot occur. When the bit is one, machine check interruptions due to system damage and instruction processing damage are permitted, but interruptions due to other machine check subclass conditions are subject to the subclass mask bits in control register 14.

Wait State (W) 516: When bit 14 is one, the CPU is waiting; that is, no instructions are processed by the CPU, but interruptions may take place. When bit 14 is zero, instruction fetching and execution occur in the normal manner. The wait indicator is one when the bit is one.

Problem State (P) 518: When bit 15 is one, the CPU is in the problem state. When bit 15 is zero, the CPU is in the supervisor state. In the supervisor state, all instructions are valid. In the problem state, only those instructions are valid that provide meaningful information to the problem program and that cannot affect system integrity; such instructions are called unprivileged instructions. The instructions that are not valid in the problem state are called privileged instructions. When a CPU in the problem state attempts to execute a privileged instruction, a privileged operation exception is recognized. Another group of instructions, called semiprivileged instructions, are executed by a CPU in the problem state only if specific authority tests are met; otherwise, a privileged operation exception or some other program exception is recognized, depending on the particular requirement which is violated.

Address Space Control (AS) 520: Bits 16 and 17, in conjunction with PSW bit 5, control the translation mode.

Condition Code (CC) 522: Bits 18 and 19 are the two bits of the condition code. The condition code is set to 0, 1, 2, or 3 depending on the result obtained in executing certain instructions. Most arithmetic and logical operations, as well as some other operations, set the condition code. The instruction BRANCH ON CONDITION can specify any selection of the condition code values as a criterion for branching.

Program Mask 524: Bits 20-23 are the four program mask bits. Each bit is associated with a program exception, as follows:

| Program Mask Bit | Program Exception |
|---|---|
| 20 | Fixed point overflow |
| 21 | Decimal overflow |
| 22 | HFP exponent underflow |
| 23 | HFP significance |

When the mask bit is one, the exception results in an interruption. When the mask bit is zero, no interruption occurs. The setting of the HFP-exponent-under-flow-mask bit of the HFP-significance-mask bit also determines the manner in which the operation is completed when the corresponding exception occurs.

Extended Addressing Mode (EA) 526: Bit 31 controls the size of effective addresses and effective address generation in conjunction with bit 32, the basic addressing mode bit. When bit 31 is zero, the addressing mode is controlled by bit 32. When bits 31 and 32 are both one, 64-bit addressing is specified.

Basic Addressing Mode (BA) 528: Bits 31 and 32 control the size of effective addresses and effective address generation. When bits 31 and 32 are both zero, 24-bit addressing is specified. When bit 31 is zero and bit 32 is one, 31-bit addressing is specified. When bits 31 and 32 are both one, 64-bit addressing is specified. Bit 31 one and bit 32 zero is an invalid combination that causes a specification exception to be recognized. The addressing mode does not control the size of PER addresses or of addresses used to access DAT, ASN, dispatchable unit control, linkage, entry, and trace tables or access lists or the linkage stack. The control of the addressing mode by bits 31 and 32 of the PSW is summarized as follows:

| PSW:31 | PSW:32 | Addressing Mode |
|---|---|---|
| 0 | 0 | 24-bit |
| 0 | 1 | 31-bit |
| 1 | 1 | 64-bit |

Instruction Address 530: Bits 33-63 of the PSW are the instruction address. The address designates the location of the leftmost byte of the next instruction to be executed, unless the CPU is in the wait state (bit 14 of the PSW is one).

In accordance with an aspect, when a configuration architectural mode facility, such as the Configuration z/Architecture Architectural Mode (CZAM) facility, is installed and activated in the computing environment, the power-on process is changed. One embodiment of a CZAM power-on process is described with reference to FIG. 6A.

Figure 6A:
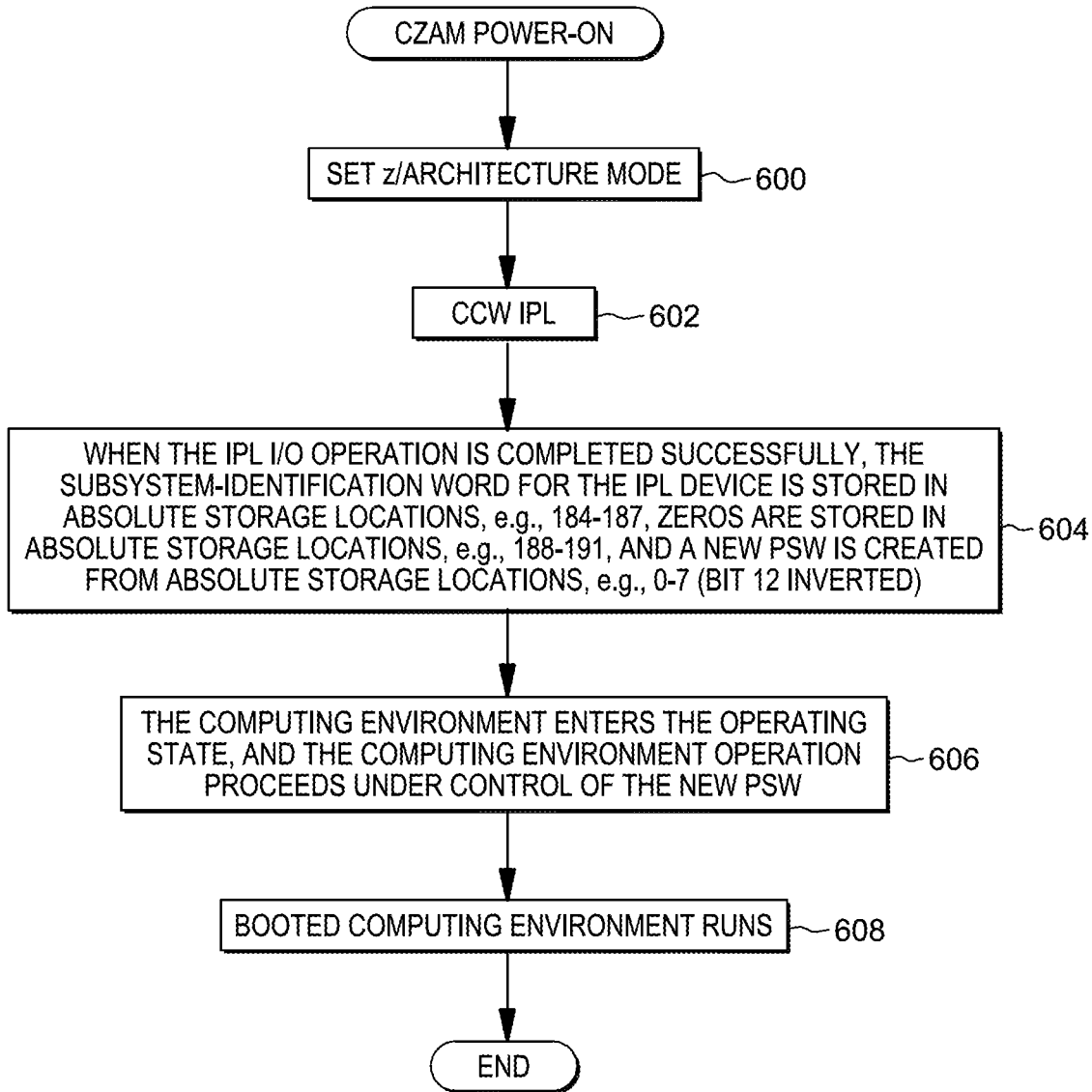
FIG. 6A depicts one embodiment of the logic to power-on a computing environment in an architectural mode different from the one architectural mode powered-on in FIG. 4A.

Referring to FIG. 6A, based on a processor of the computing environment being powered on, the computing environment is set to the particular architectural mode specified by the configuration architectural mode facility, e.g., the z/Architecture mode (also referred to as ESAME) when CZAM is installed, STEP 600. For instance, an initial program load (IPL), such as a channel control word (CCW) initial program load (IPL), is performed, as described above, STEP 602, and when the IPL input/output operation is completed successfully, a subsystem identification word for the IPL device is stored in selected absolute storage locations (e.g., locations 184-187), zeros are stored in other selected absolute storage locations (e.g., locations 188-191), and in this embodiment, a 16-byte new program status word (PSW) is created from selected absolute storage locations (e.g., locations 0-7), STEP 604. The new 16-byte PSW is formed, e.g., from the contents of the selected storage doubleword (e.g., locations 0-7). Bit 12 of the doubleword is to be one; otherwise, an error may be indicated. (The error may be a specification exception which is recognized, a machine check, or yet another error indication.) Bits 0-32 of the newly created PSW are set to bits 0-32 of the selected doubleword, except with bit 12 inverted. Bits 33-96 of the newly created PSW are set to zeros. Bit positions 97-127 of the newly created PSW are initialized from bits 33-63 of the selected doubleword.

In one embodiment, the PSW fields which are to be loaded by the instruction are not checked for validity before they are loaded. In one embodiment, bit 12 of the PSW is checked for validity. In yet another embodiment, all fields are checked for validity. In another embodiment, any bits not checked prior to the loading of the PSW are checked for validity after the PSW has been initialized, and the processor may indicate an error (e.g., by raising a specification exception which is recognized, a machine check, or yet another error indication.)

The computing environment enters the operating state, and operation of the computing environment proceeds under control of the new program status word (PSW), STEP 606. The booted computing environment then runs, STEP 608, as further described with reference to FIG. 6B.

Figure 6B:
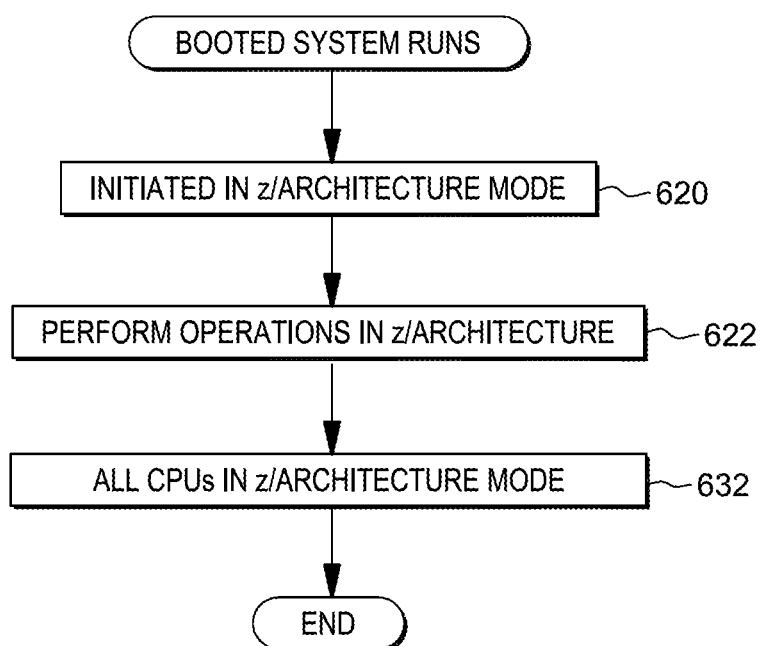
FIG. 6B depicts one embodiment of further processing associated with the power-on process of FIG. 6A.

Referring to FIG. 6B, the booted computing environment is initiated in z/Architecture mode, STEP 620, and thus, operations are performed in z/Architecture mode, STEP 622. No mode switch is necessary, and processing continues directly with processing in the z/Architecture mode. Thus, in one embodiment, the following steps are not needed: A Signal Processor (SIGP) operation to switch from ESA/390 mode to z/Architecture mode; a determination as to whether the SIGP operation is an accepted operation; the transition to z/Architecture if it is an accepted operation; or the error indication, if the SIGP operation is not accepted.

All of the processors of the computing environment (i.e., the environment being configured, e.g., single processor, logical partition, VM guest) are in z/Architecture mode, without performing the above indicated steps. Thus, as described herein, in accordance with one aspect, the ability to boot or power-on in ESA/390 mode is removed from the computing environment that is configured for both ESA/390 and z/Architecture. In particular, although a computing environment is configured to support multiple architectures, a capability is provided to restrict certain aspects of at least one of the configured architectures, one of the aspects being the ability to power-on in that architecture.

In one or more embodiments, the powering-on in z/Architecture mode provides a mechanism to specify one of (1) a logical partition (guest-1), and (2) a logical partition and guest-2 are to be booted and reset in z/Architecture mode, without the need to boot in ESA/390 mode. This feature may be installed unconditionally or under the control of a configuration switch.

The boot sequence with respect to PSW initialization is modified. For instance, at the end of IPL, the IPL PSW at absolute locations 0-7 is loaded. As is currently done when the reset condition is ESA/390, bit 12 is one, making a valid ESA/390 IPL PSW, and the program proceeds to execute instructions in the ESA/390 architectural mode. With CZAM installed, the reset condition is z/Architecture, bit 12 is still one, making a valid ESA/390 IPL PSW, but bit 12 is inverted during the formation of the 16 byte z/Architecture current PSW, as defined above.

In addition to the power-on process, other processes, behaviors and/or operations may also be changed or affected by installation of a configuration architectural mode facility. These affected processes, behaviors, and/or operations are specific to the ESA/390 and z/Architecture modes. However, similar and/or different processes may be affected for other types of architectures. Example processes, behaviors and/or operations that may be affected in one or more embodiments include, for instance:

(1) Enabling a switch from mode to self (e.g., from z/Architecture mode to z/Architecture mode) without generating an error (or ignoring the error). That is, a processor may issue a SIGP instruction to switch to z/Architecture mode and if it is already in that mode, no error will be generated. Previously, attempting a switch to the mode corresponding to the current mode generated an error.

(2) Disabling a switch to ESA/390 mode. Based on installing and activating CZAM, the switch to ESA/390 is disabled and now generates an error. A switch back to ESA/390 is prevented by checking bit 12 of the PSW, and taking an exception, if bit 12 is not set to indicate z/Architecture mode (represented by a bit 12 of "1" in storage which is inverted to bit "0" to represent z/Architecture in the PSW when an ESA/390 PSW is converted to a valid z/Architecture PSW).

(3) Modifying the Load PSW operation to restrict handling of bit 12. If the Configuration z/Architecture Architectural Mode facility is installed, Load PSW recognizes a specification exception if bit 12 of its second operand is not one. Load PSW loads bits 0-32 of its second operand, except with bit 12 inverted, and bits 33-63 of the operand as bits 0-32 and 97-127, respectively of the current PSW, and it sets bits 33-96 of the current PSW to zeros.

Figure 7:
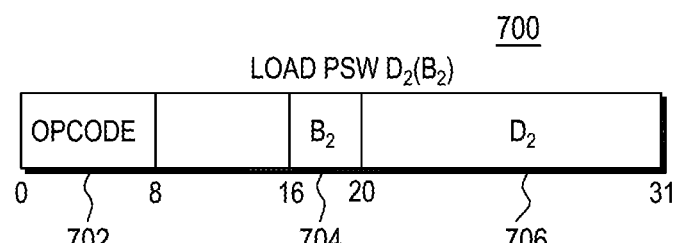
FIG. 7 depicts one example of a format of a Load Program Status Word instruction.

Further details regarding the Load PSW instruction are described with reference to FIG. 7. In one embodiment, a Load PSW instruction 700 includes an operation code field 702 that includes an operation code to indicate a load PSW operation; a base field ($B_2$) 704; and a displacement field ($D_2$) 706. Contents of the general register designated by the $B_2$ field are added to the contents of the $D_2$ field to form an address of a second operand in storage (referred to as the second operand address).

In operation of the Load PSW instruction, the current PSW is replaced by a 16-byte PSW formed from the contents of the doubleword at the location designated by the second operand address.

Bit 12 of the doubleword is to be one; otherwise, a specification exception may be recognized, depending on the model. If the Configuration z/Architecture Architectural Mode facility is installed, then a specification exception is recognized if bit 12 of the doubleword is not one.

Bits 0-32 of the doubleword, except with bit 12 inverted, are placed in positions 0-32 of the current PSW. Bits 33-63 of the doubleword are placed in positions 97-127 of the current PSW. Bits 33-96 of the current PSW are set to zero.

A serialization and checkpoint synchronization function is performed before or after the operand is fetched and again after the operation is completed.

The operand is to be designated on a doubleword boundary; otherwise, a specification exception is recognized. A specification exception may be recognized if bit 12 of the operand is zero, depending on the model.

The PSW fields which are to be loaded by the instruction are not checked for validity before they are loaded, except for the checking of bit 12. However, immediately after loading, a specification exception is recognized, and a program interruption occurs, when any of the following is true for the newly loaded PSW:

Any of bits 0, 2-4, 12, or 24-30 is a one.

Bits 31 and 32 are both zero, and bits 97-103 are not all zeros.

Bits 31 and 32 are one and zero, respectively.

In these cases, the operation is completed, and the resulting instruction length code is 0.

The operation is suppressed on all addressing and protection exceptions.

Resulting Condition Code: The code is set as specified in the new PSW Loaded.

Program Exceptions:
Access (fetch, operand 2)
Privileged operation
Specification Programming Note: The second operand should have the format of an ESA/390 PSW. A specification exception will be recognized during or after the execution of LOAD PSW if bit 12 of the operand is zero.

Further details regarding the PSW are described in "Development and Attributes of z/Architecture," Plambeck et al., IBM J. Res. & Dev., Vol. 46, No. 4/5, July/September 2002, which is hereby incorporated by reference herein in its entirety.

In addition to the above processes, operations and/or behaviors that may be changed due to installation of a configuration architectural mode facility, the reset mode may also be changed in one or more embodiments, as explained below.

(4) Changes the reset mode (e.g., for reset, clear reset, and other actions for reset). When the CZAM facility is installed, the CPU reset sets the architectural mode to the z/Architecture mode, if it is caused by activation of, for instance, the load-normal key.

There are a number of reset functions that are included as part of the ESA/390 and z/Architecture modes, including, for instance, CPU reset, initial CPU reset, Subsystem reset, Clear reset and Power-on reset, each of which is described below.

CPU Reset

CPU reset provides a means of clearing equipment check indications and any resultant unpredictability in the CPU state with the least amount of information destroyed. In particular, it is used to clear check conditions when the CPU state is to be preserved for analysis or resumption of the operation. If the Configuration z/Architecture Architectural Mode (CZAM) facility is not installed, CPU reset sets the architectural mode to the ESA/390 mode if it is caused by activation of the load-normal key (an operator facility). When the CZAM facility is installed, CPU reset sets the architectural mode to the z/Architecture mode if it is caused by activation of the load-normal key. When CPU reset sets the ESA/390 mode, it saves the current PSW so that PSW can be restored by a Signal Processor Set Architecture order that changes the architectural mode back to z/Architecture.

CPU reset causes the following actions, in one embodiment:

1. The execution of the current instruction or other processing sequence, such as an interruption, is terminated, and all program-interruption and supervisor-call-interruption conditions are cleared.
2. Any pending external-interruption conditions which are local to the CPU are cleared. Floating external-interruption conditions are not cleared.
3. Any pending machine-check-interruption conditions and error indications which are local to the CPU and any check-stop states are cleared. Floating machine-check-interruption conditions are not cleared. Any machine-check condition which is reported to all CPUs in the configuration and which has been made pending to a CPU is said to be local to the CPU.
4. All copies of prefetched instructions or operands are cleared. Additionally, any results to be stored because of the execution of instructions in the current checkpoint interval are cleared.
5. The ART (Access Register Translation)-lookaside buffer and translation-lookaside buffer are cleared of entries.
6. If the reset is caused by activation of the load-normal key on any CPU in the configuration, the following actions occur:
   a. When the CZAM facility is not installed, the architectural mode of the CPU (and of all other CPUs in the configuration because of the initial CPU reset or CPU resets performed by them) is changed from the z/Architecture mode to the ESA/390 mode. If the CZAM facility is installed, the architectural mode of the CPU (and of all other CPUs in the configuration because of the initial CPU reset or CPU resets performed by them) is set to the z/Architecture mode.
   b. When the CZAM facility is not installed, the current PSW is saved for subsequent use by a Signal Processor Set Architecture order that restores the z/Architecture mode.
   c. When the CZAM facility is not installed, the current PSW is changed from 16 bytes to eight bytes. The bits of the eight-byte PSW are set as follows: bits 0-11 and 13-32 are set equal to the same bits of the 16-byte PSW, bit 12 is set to one, and bits 33-63 are set equal to bits 97-127 of the 16-byte PSW.

A CPU reset caused by activation of the system reset-normal key or by the Signal Processor CPU-Reset order, and any CPU reset in the ESA/390 mode, do not affect the captured z/Architecture-PSW register (i.e., a PSW saved when the CPU last went from the z/Architecture mode to the ESA/390 mode because of a Set Architecture order with code 0 or a CPU reset due to activation of the load-normal key).

7. The CPU is placed in the stopped state after actions 1-6 have been completed. When the CCW-type IPL sequence follows the reset function on that CPU, the CPU enters the load state at the completion of the reset function and does not necessarily enter the stopped state during the execution of the reset operation. When the list-directed IPL sequence follows the reset function on that CPU, the CPU enters the operating state and does not necessarily enter the stopped state during the execution of the reset operation.

Registers, storage contents, and the state of conditions external to the CPU remain unchanged by CPU reset. However, the subsequent contents of the register, location, or state are unpredictable if an operation is in progress that changes the contents at the time of the reset. A lock held by the CPU when executing PERFORM LOCKED OPERATION is not released by CPU reset.

When the reset function in the CPU is initiated at the time the CPU is executing an I/O instruction or is performing an I/O interruption, the current operation between the CPU and the channel subsystem may or may not be completed, and the resultant state of the associated channel-subsystem facility may be unpredictable.

Programming Notes:
1. Most operations which would change a state, a condition, or the contents of a field cannot occur when the CPU is in the stopped state. However, some signal-processor functions and some operator functions may change these fields. To eliminate the possibility of losing a field when CPU reset is issued, the CPU should be stopped, and no operator functions should be in progress.
2. If the architectural mode is changed to the ESA/390 mode and bit 31 of the current PSW is one, the PSW is invalid.

Initial CPU Reset

Initial CPU reset provides the functions of CPU reset together with initialization of the current PSW, captured z/Architecture PSW, CPU timer, clock comparator, prefix, breaking-event-address control, floating point control, and time-of-day (TOD) programmable registers. If the CZAM facility is not installed, initial CPU reset sets the architectural mode to the ESA/390 mode if it is caused by activation of the load-normal key. When the CZAM facility is installed, initial CPU reset sets the architectural mode to the z/Architecture mode if it is caused by activation of the load-normal key.

Initial CPU reset combines the CPU reset functions with the following clearing and initializing functions:
1. When the CZAM facility is not installed, if the reset is caused by activation of the load-normal key, the architectural mode of the CPU (and of all other CPUs in the configuration) is set to the ESA/390 mode. Otherwise, if the CZAM facility is installed, the architectural mode of the CPU (and of all other CPUs in the configuration) is set to the z/Architecture mode.
2. The contents of the current PSW, captured z/Architecture-PSW, prefix, CPU timer, clock comparator, and TOD programmable register are set to zero. When the IPL sequence follows the reset function on that CPU, the contents of the PSW are not necessarily set to zero.
3. The contents of the control registers are set to their initial z/Architecture values. All 64 bits of the control registers are set regardless of whether the CPU is in the ESA/390 or the z/Architecture architectural mode.
4. The contents of the floating point control register are set to zero.
5. The contents of the breaking-event-address register are initialized to 0000000000000001 hex.

These clearing and initializing functions include validation.

Setting the current PSW to zero when the CPU is in the ESA/390 architectural mode at the end of the operation causes the PSW to be invalid, since PSW bit 12 is to be one in that mode. Thus, in this case if the CPU is placed in the operating state after a reset without first introducing a new PSW, a specification exception is recognized.

Subsystem Reset

Subsystem reset provides a means for clearing floating interruption conditions as well as for invoking I/O system reset.

Clear Reset

Clear reset causes initial CPU reset and subsystem reset to be performed and, additionally, clears or initializes all storage locations and registers in all CPUs in the configuration, with the exception of the TOD clock. Such clearing is useful in debugging programs and in ensuring user privacy. Clear reset also releases all locks used by the PERFORM LOCKED OPERATION instruction. If the CZAM facility is not installed, clear reset sets the architectural mode to the ESA/390 mode. When the CZAM facility is installed, clear reset sets the architectural mode to the z/Architecture mode. Clearing does not affect external storage, such as direct access storage devices used by the control program to hold the contents of unaddressable pages.

Clear reset combines the initial CPU reset function with an initializing function which causes the following actions:
1. When the CZAM facility is not installed, the architectural mode of all CPUs in the configuration is set to the ESA/390 mode. If the CZAM facility is installed, the architectural mode of all CPUs in the configuration is set to the z/Architecture mode.
2. The access, general, and floating point registers of all CPUs in the configuration are set to zero. All 64 bits of the general registers are set to zero regardless of whether the CPU was in the ESA/390 or z/Architecture architectural mode when the clear-reset function was initiated.
3. The contents of the main storage in the configuration and the associated storage keys are set to zero with valid checking-block code.
4. The locks used by any CPU in the configuration when executing the PERFORM LOCKED OPERATION instruction are released.
5. A subsystem reset is performed.

Validation is included in setting registers and in clearing storage and storage keys.

Programming Notes:
1. The architectural mode is not changed by activation of the system-reset-normal key or by execution of a Signal Processor CPU-Reset or Initial-CPU-reset order. All CPUs in the configuration are in the same architectural mode.
2. For the CPU-reset operation not to affect the contents of fields that are to be left unchanged, the CPU is not to be executing instructions and is to be disabled for all interruptions at the time of the reset. Except for the operation of the CPU timer and for the possibility of a machine-check interruption occurring, all CPU activity can be stopped by placing the CPU in the wait state and by disabling it for I/O and external interruptions. To avoid the possibility of causing a reset at the time that the CPU timer is being updated or a machine-check interruption occurs, the CPU is to be in the stopped state.

3. CPU reset, initial CPU reset, subsystem reset, and clear reset do not affect the value and state of the TOD clock.
4. The conditions under which the CPU enters the check-stop state are model-dependent and include malfunctions that preclude the completion of the current operation. Hence, if CPU reset or initial CPU reset is executed while the CPU is in the check-stop state, the contents of the PSW, registers, and storage locations, including the storage keys and the storage location accessed at the time of the error, may have unpredictable values, and, in some cases, the contents may still be in error after the check-stop state is cleared by these resets. In this situation, a clear reset is required to clear the error.

Power-On Reset

The power-on reset function for a component of the machine is performed as part of the power-on sequence for that component. The power-on sequences for the TOD clock, main storage, expanded storage, and channel subsystem may be included as part of the CPU power-on sequence, or the power-on sequence for these units may be initiated separately.

CPU Power-On Reset: The power-on reset causes initial CPU reset to be performed and may or may not cause I/O-system reset to be performed in the channel subsystem. The contents of general registers, access registers, and floating-point registers are cleared to zeros with valid checking-block code. Locks used by PERFORM LOCKED OPERATION and associated with the CPU are released unless they are held by a CPU already powered on. If the CZAM facility is not installed and the reset is associated with establishing a configuration, the CPU is placed in the ESA/390 mode; otherwise, the CPU is placed in the architectural mode of the CPUs already in the configuration. If the CZAM facility is installed, the CPU is placed in the z/Architecture mode.

CPU reset, initial CPU reset, subsystem reset, and clear reset may be initiated manually by using the operator facilities. Initial CPU reset is part of the initial program loading function. Power-on reset is performed as part of turning power on.

When the CZAM facility is not installed, if the reset is initiated by the system-reset-clear, load-normal, or load-clear key or by a CPU power-on reset that establishes the configuration, the architectural mode is set to the ESA/390 mode; otherwise, the architectural mode is unchanged, except that power-on reset sets the mode to that of the CPUs already in the configuration. If the CZAM facility is installed, the architectural mode is set to the z/Architecture mode.

Other processes, operations and/or behaviors that may be changed due to installation of a configuration architectural mode facility are described below:

(5) Suppresses other reset related actions that are taken to facilitate change between ESA/390 and z/Architecture mode, when reset is performed. When the CZAM facility is not installed, the current PSW is saved for subsequent use by a Signal Processor Set Architecture order that restores the z/Architecture mode. When the CZAM facility is not installed, the current PSW is changed from 16 bytes to eight bytes. The bits of the eight byte PSW are set as follows, in one example: bits 0-11 and 13-32 are set equal to the same bits of the 16-byte PSW, bit 12 is set to one, and bits 33-63 are set equal to bits 97-127 of the 16 byte PSW. When the CZAM facility is installed, the PSW is not saved for subsequent used by a Signal Processor Set Architecture order that restores the z/Architecture mode, and the current PSW is not changed from 16 bytes to 8 bytes.

(6) Changes the process for configuring a CPU with a configure CPU SCLP (Service Call Logical Processor) command, and load key operations. Rather than configuring in ESA/390, configure in the mode defined by reset. The configure CPU SCLP command places the subject CPU in the architectural mode of the CPUs already in the configured state. At least the first CPU placed in a configuration is placed there in conjunction with a CPU power on reset and, as part of that reset, is placed in the architecture mode defined in CPU power on reset. A model may alternatively set the mode of CPUs that are in the standby state when it sets the mode of the configured CPUs.

Activating the load-clear key or the load-normal key sets the architectural mode as defined in clear reset or initial CPU reset, respectively.

(7) Changes SIGP so as not to allow a Set Architecture order to change the architectural mode to ESA/390.

Figure 8A:
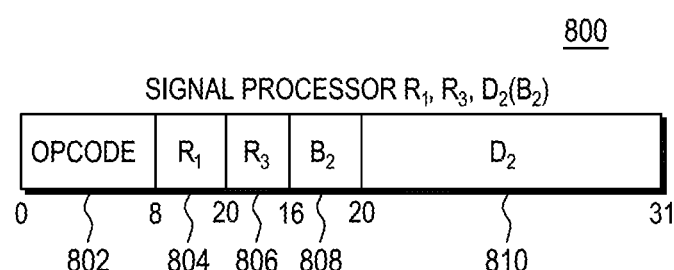
FIG. 8A depicts one example of a format of a Signal Processor instruction.

One embodiment of a Signal Processor (SIGP) instruction is described with reference to FIG. 8A. In one embodiment, a Signal Processor instruction 800 has a plurality of fields, including, for instance, an operation code field (opcode) 802 having an operation code indicating a signal processor operation; a first register field (R$_1$) 804; a second register field (R$_3$) 806; a base field (B$_2$) 808; and a displacement field (D$_2$) 810. R$_1$ designates a general register, the contents of which are the first operand; R$_3$ designates a general register, the contents of which are the third operand; and the contents of a register designated by R$_2$ are added to the displacement in D$_2$ to provide an address of a second operand.

In operation, an eight-bit order code and, if called for, a 32-bit parameter are transmitted to the CPU designated by the CPU address contained in the third operand. The result is indicated by the condition code and may be detailed by status assembled in bit positions 32-63 of the first-operand location.

The second-operand address is not used to address data; instead, bits 56-63 of the address contain the eight-bit order code. Bits 0-55 of the second-operand address are ignored. The order code specifies the function to be performed by the addressed CPU. The assignment and definition of order codes include, for instance, the following, in one example:

| Code | | |
|---|---|---|
| (Dec) | (Hex) | Order |
| 0 | 00 | Unassigned |
| 1 | 01 | Sense |
| 2 | 02 | External call |
| 3 | 03 | Emergency signal |
| 4 | 04 | Start |
| 5 | 05 | Stop |
| 6 | 06 | Restart |
| 7 | 07 | Unassigned |
| 8 | 08 | Unassigned |
| 9 | 09 | Stop and store status |
| 10 | 0A | Unassigned |
| 11 | 0B | Initial CPU reset |
| 12 | 0C | CPU reset |
| 13 | 0D | Set prefix |
| 14 | 0E | Store status at address |
| 15-17 | 0F-11 | Unassigned |
| 18 | 12 | Set architecture |
| 19 | 13 | Conditional Emergency Signal |
| 14 | 14 | Unassigned |
| 21 | 15 | Sense Running Status |
| 22-255 | 16-FF | Unassigned |

The 16-bit binary number contained in bit positions 48-63 of general register R$_3$ forms the CPU address. Bits 0-47 of the register are ignored. When the specified order is the Set Architecture order, the CPU address is ignored; all other CPUs in the configuration are considered to be addressed.

The general register containing the 32-bit parameter in bit positions 32-63 is R$_1$ or R$_1$+1, whichever is the odd-numbered register. It depends on the order code whether a parameter is provided and for what purpose it is used.

The operands just described have the following formats, in one example:

General register designated by R$_1$: Bits 0-31 unused; bits 32-63 include status;
General register designated by R$_1$ or R$_1$+1, which ever is the odd-numbered register: Bits 0-31 unused; bits 32-63 include the parameter;
General register designated by R$_3$: Bits 0-48 unused; bits 49-63 include the CPU address;
Second-operand address: Bits 0-55 unused; bits 56-63 include the order code.

A serialization function is performed before the operation begins and again after the operation is completed.

When the order code is accepted and no nonzero status is returned, condition code 0 is set. When status information is generated by this CPU (the CPU performing the SIGP) or returned by the addressed CPU, the status is placed in bit positions 32-63 of general register R$_1$, bits 0-31 of the register remain unchanged, and condition code 1 is set.

When the access path to the addressed CPU is busy, or the addressed CPU is operational but in a state where it cannot respond to the order code, condition code 2 is set.

When the addressed CPU is not operational (that is, it is not provided in the installation, it is not in the configuration, it is in any of certain customer-engineer test modes, or its power is off), condition code 3 is set.

Resulting Condition Code:

| | |
|---|---|
| 0 | Order code accepted |
| 1 | Status stored |
| 2 | Busy |
| 3 | Not operational |

Program Exceptions:
Privileged operation
Transactional constraint

When the Set Architecture Signal Processor order is specified in bit positions 56-63 of the second operand address of the Signal Processor instruction, the contents of bit positions 56-63 of the parameter register are used as a code specifying an architectural mode to which all CPUs in the configuration are to be set: code 0 specifies the ESA/390 mode, and codes 1 and 2 specify the z/Architecture mode. Code 1 specifies that, for each of all CPUs in the configuration, the current ESA/390 PSW is to be transformed to a z/Architecture PSW. Code 2 specifies that the PSW of the CPU executing Signal Processor is to be transformed to a z/Architecture PSW and that, for each of all other CPUs in the configuration, the PSW is to be set with the value of the captured z/Architecture-PSW register for that CPU. The setting of the PSW with the value of the captured-z/Architecture-PSW register will restore the PSW that existed when the CPU was last in the z/Architecture mode, provided that the captured-z/Architecture-PSW register has not been set to all zeros by a reset.

Bits 0-55 of the parameter register are ignored. The contents of the CPU-address register of the Signal Processor instruction are ignored; all other CPUs in the configuration are considered to be addressed.

When the CZAM facility is not installed, the order is accepted only if the code is 0, 1, or 2, the CPU is not already in the mode specified by the code, each of all other CPUs is in either the stopped or the check-stop state, and no other condition precludes accepting the order.

When the CZAM facility is installed, code 0 is not accepted because a return to the ESA/390 mode is not permitted, and since the CPU is already in the z/Architecture architectural mode, specification of codes 1 and 2 result in a completion indicating invalid-parameter and condition code 1. The other prerequisite conditions normally verified by the Set Architecture order may or may not be checked.

If accepted, the order is completed by all CPUs during the execution of Signal Processor. In no case, in this embodiment, can different CPUs be in different architectural modes.

The Set Architecture order is completed, as follows, in one example:

If the code in the parameter register is not 0, 1, or 2, or if the CPU is already in the architectural mode specified by the code, the order is not accepted. Instead, bit 55 (invalid parameter) of the general register designated by the R1 field of the Signal Processor instruction is set to one, and condition code 1 is set.

If it is not true that all other CPUs in the configuration are in the stopped or check-stop state, the order is not accepted. Instead, bit 54 (incorrect state) of the general register designated by the R1 field of the Signal Processor instruction is set to one, and condition code 1 is set.

The architectural mode of all CPUs in the configuration is set as specified by the code (e.g., bit 12 of the PSW to control operations is set to the specified architectural mode, and/or another indication in the computing environment is set indicating the specified architectural mode).

If the order changes the architectural mode from ESA/390 to z/Architecture and the code is 1, then, for each CPU in the configuration, the eight-byte current PSW is changed to a 16-byte PSW, and the bits of the 16-byte PSW are set as follows: bits 0-11 and 13-32 are set equal to the same bits of the eight-byte PSW, bit 12 and bits 33-96 are set to zeros, and bits 97-127 are set equal to bits 33-63 of the eight-byte PSW. Also, bit 19 of the ESA/390 prefix, which becomes bit 51 of the z/Architecture prefix, is set to zero.

If the code is 2, the PSW of the CPU executing Signal Processor and the prefix values of all CPUs are set as in the code-1 case. For each of all other CPUs in the configuration, the PSW is set with the value of the captured-z/Architecture-PSW register. However, the captured-z/Architecture-PSW register has been set to all zeros if the CPU performed a reset, other than CPU reset, either at the time of the architectural-mode transition or subsequently.

If the order changes the architectural mode from z/Architecture to ESA/390, then, for each CPU in the configuration, (1) the current PSW, which is the updated PSW in the case of the CPU executing Signal Processor, is saved in the captured-z/Architecture-PSW register, and (2) the 16-byte current PSW is changed to an eight-byte PSW by setting the bits of the eight-byte PSW as follows: bits 0-11 and 13-32 are set equal to the same bits of the 16-byte PSW, bit 12 is set to one, and bits 33-63 are set equal to bits 97-127 of the 16-byte PSW.

Bit 51 of the z/Architecture prefix, which becomes bit 19 of the ESA/390 prefix, remains unchanged.

The ALBs and TLBs of all CPUs in the configuration are cleared of their contents.

A serialization and checkpoint-synchronization function is performed on all CPUs in the configuration.

If the order changes the architectural mode from z/Architecture to ESA/390 and the Signal Processor instruction causes occurrence of an instruction-fetching PER event, only the rightmost 31 bits of the address of the instruction are stored in the ESA/390 PER-address field.

In one embodiment, with CZAM, the following is a prerequisite: Each of all other CPUs is in either the stopped or the check-stop state, and no other condition precludes accepting the order. When the CZAM facility is installed, code 0 is not accepted because a return to the ESA/390 mode is not permitted, and since the CPU is already in the z/Architectural architectural mode, specification of codes 1 and 2 result in a completion indicating invalid parameter and condition code 1. The other prerequisite conditions normally verified by the Set Architecture order may or may not be checked. In yet another embodiment, SIGP with code 1 and 2 indicates successful completion without further indication.

Figure 8B:
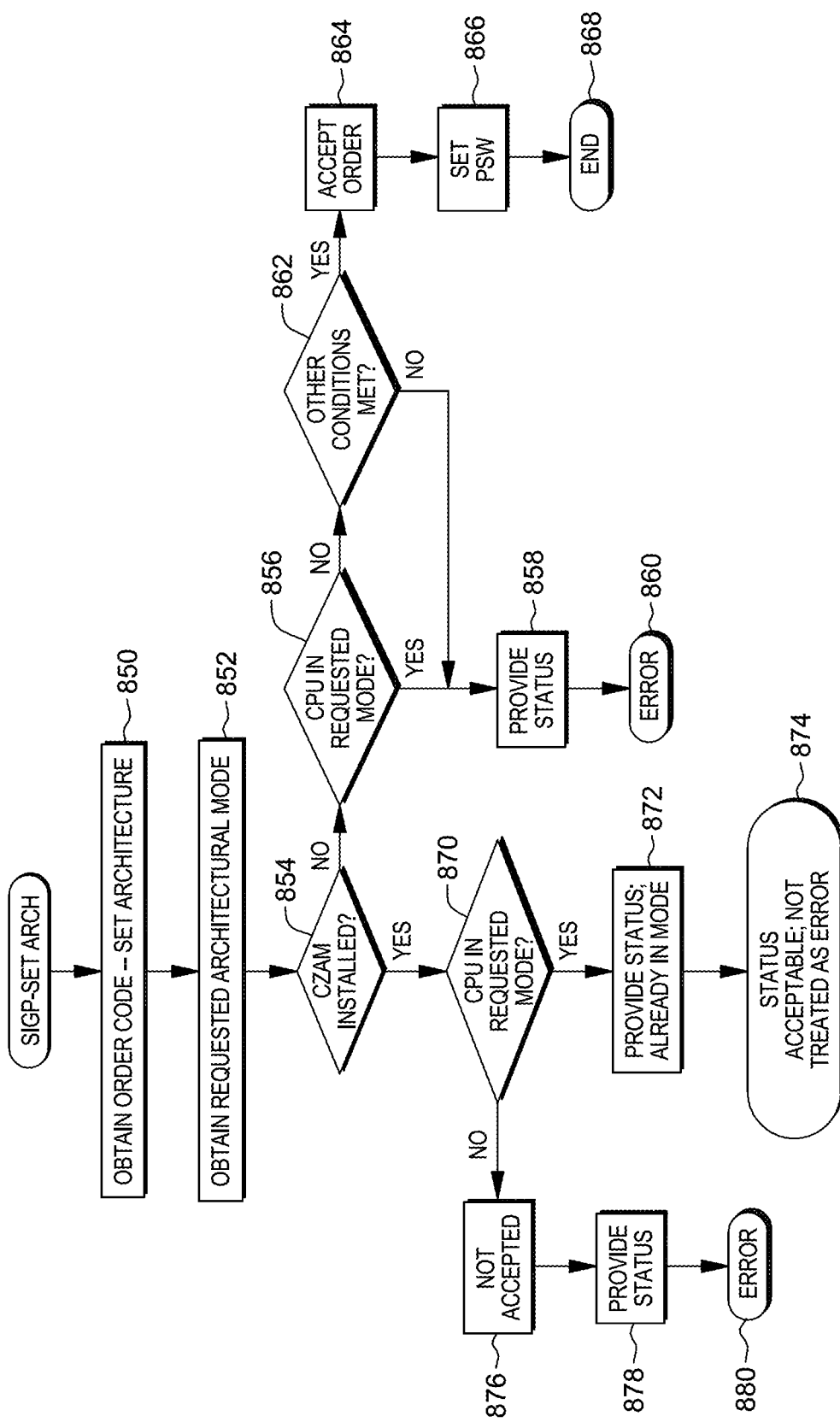
FIG. 8B depicts one embodiment of processing associated with the Signal Processor instruction of FIG. 8A.

One embodiment of processing associated with executing a SIGP instruction for a Set Architecture order code is described with reference to FIG. 8B. Referring to FIG. 8B, a processor of the computing environment executes a SIGP instruction and obtains an order code that indicates a Set Architecture operation, STEP 850. In one example, the order code is included in the second-operand address of the SIGP instruction.

Additionally, the requested architectural mode to be switched to is obtained from, e.g., the parameter register specified by the SIGP instruction, STEP 852. Further, a determination is made as to whether a configuration architectural mode facility, such as CZAM, is installed, INQUIRY 854. This is determined, in one example, by a facility indicator.

If CZAM is not installed, then a further determination is made as to whether the CPU is already in the requested architectural mode, INQUIRY 856. If so, then status is provided in, e.g., a register designated by the SIGP instruction, STEP 858, and the status is treated as an error, STEP 860. However, if the CPU is not in the requested mode, INQUIRY 856, then a determination is made as to whether other conditions specified by the instruction, such as whether the other CPUs of the computing environment being configured are in a stopped state, etc., are met, INQUIRY 862. If the conditions are not met, then processing continues to STEP 858. Otherwise, the order is accepted, STEP 864, and the architectural mode is to be changed. Thus, the PSW is set, as described above, STEP 866, and processing for this aspect of the instruction ends, STEP 868.

Returning to INQUIRY 854, if CZAM is installed, then a determination is made as to whether the CPU is in the requested mode, INQUIRY 870. If the CPU is already in the requested mode, then, in one example, status is provided that the CPU is already in the requested architectural mode (e.g., z/Architecture), STEP 872. In this embodiment, however, this status is acceptable and not treated as an error, STEP 874. Either, it is ignored, or in another embodiment, a condition code may be provided that is a non-error code. In yet a further embodiment, the status merely indicates successful completion. Other possibilities also exist to indicate no error even though the CPU is already in the requested architectural mode.

Returning to INQUIRY 870, if however, the CPU is not in the requested mode, then the order is not accepted, since it is illegal to return to the one architectural mode (e.g., ESA/390), STEP 876. Status is provided, STEP 878, which is considered an error, STEP 880.

In one embodiment, when CZAM is in a system as a non-selectable facility, then INQUIRY 854 may be omitted and control may pass from STEP 852 directly to STEP 870. In such an embodiment, STEPs 854 to 868 may not be implemented.

In another embodiment, when an order to switch to the current architecture mode is received, the order may not be accepted and an error may be indicated in STEP 874.

Other behaviors, processes and/or operations that may change based on installation of a CAM include:

(8) Changes to the facility bits: A new bit, e.g., bit 138, is added to the facility bits to indicate the Configuration z/Architecture Architectural Mode facility, and bit 2, which indicates whether the z/Architectural architectural mode is active, is to be set to one (indicating active).

In at least one embodiment, the CZAM facility is installed for LPARs and guest-1 (first level guests—guests initiated by a hypervisor (e.g., by issuing a Start Interpretive Execution (SIE) instruction), but not for guest-2 (second level guests—a guest started by another guest (e.g., by issuing a SIE instruction).

In at least one embodiment, when CZAM is installed and a z/Architecture guest-2 is initiated, the guest is initiated in z/Architecture mode in accordance with the technique of FIG. 6A. However, when CZAM is installed, and an ESA/390 guest-2 is initiated, it is initiated in ESA/390 mode, in accordance with the technique of FIG. 4A, since it is not affected by CZAM, in this embodiment. Thus, the host and first level guests are controlled by CZAM, in which they will be initiated/reset, etc. in z/Architecture, regardless of preference for architectural mode (e.g., forced to be in z/Architecture, since ESA/390 not supported), but the second level ESA/390 guests are not affected by CZAM and will continue to be initiated/reset, etc. in ESA/390.

As described herein, based on installing a configuration architectural mode facility, such as a Configuration z/Architecture Architectural Mode facility, certain processes, operations and/or behaviors of a computing environment that is configured for multiple architectural modes are changed. One such process is the power-on process. Further aspects of processing associated with a power-on process when a configuration architectural mode facility is installed are described with reference to FIG. 9.

Figure 9:
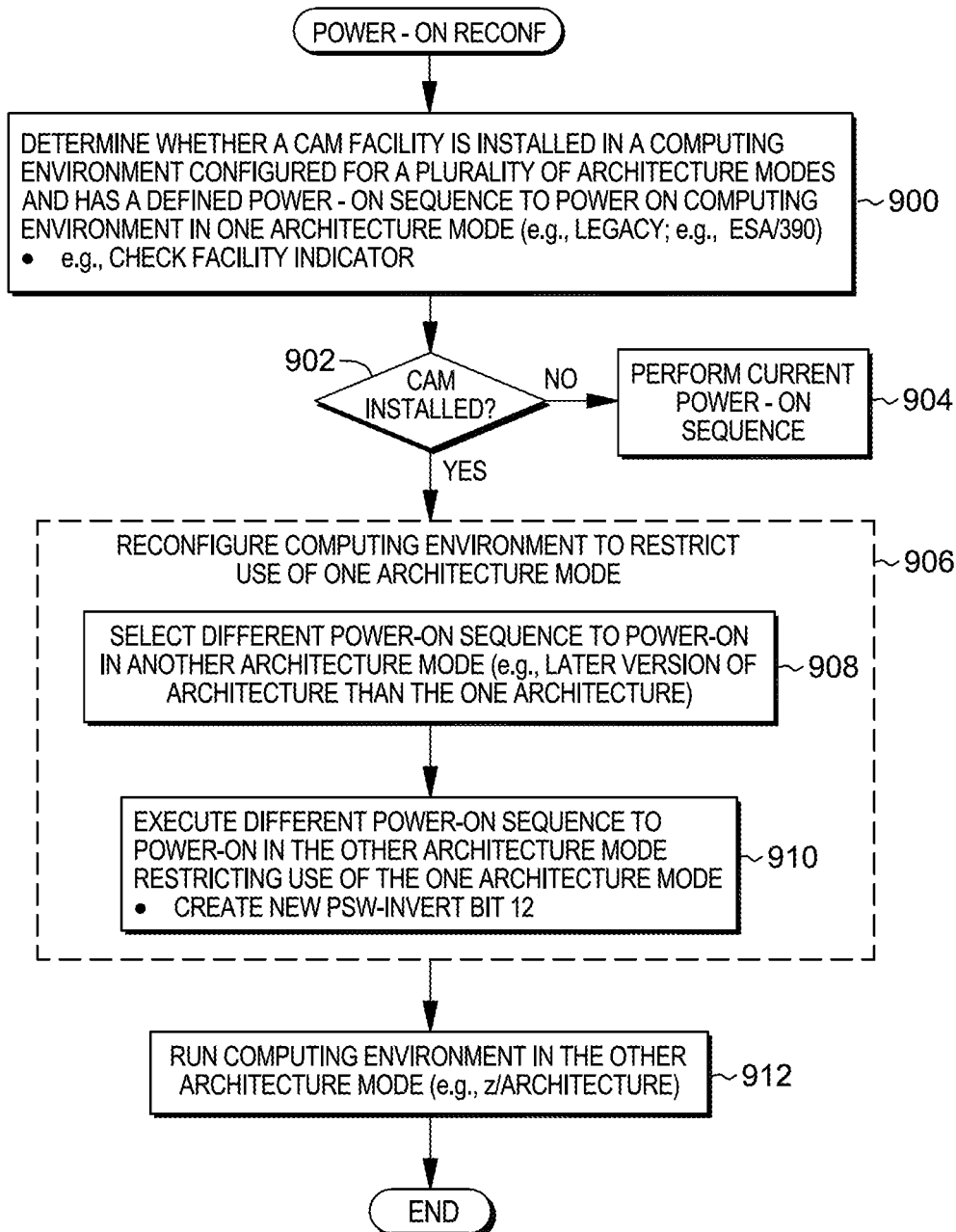
FIG. 9 depicts one embodiment of the logic to power-on a computing environment in a reconfigured configuration.

Referring to FIG. 9, initially a determination is made as to whether a configuration architectural mode facility is installed in a computing environment configured for a plurality of architectural modes and has a defined power-on sequence to power-on the computing environment in one architectural mode (e.g., a legacy mode, such as ESA/390), STEP 900. The one architectural mode including a first instruction set architecture and having a first set of supported features, such as 31-bit addressing, use of 32-bit general purpose registers, and various features. If it is determined that the configuration architectural mode facility is not installed, INQUIRY 902, then the current power-on sequence is performed, STEP 904, as described with reference to FIGS. 4A-4B. Otherwise, the computing environment is reconfigured to restrict use of the one architectural mode (e.g., the legacy ESA/390 mode), STEP 906. The reconfiguration includes, for instance, selecting a different power-on sequence to power-on the computing environment in another architectural mode (e.g., a later or enhanced version of the architecture mode—e.g., z/Architecture), STEP 908. The another architectural mode including a second instruction set architecture and having a second set of supported features, such as 64-bit addressing, use of 64-bit general purpose registers and various facilities, such as dynamic address translation, and/or other facilities. The power-on sequence is then executed to power-on the computing environment in the other architectural mode restricting use of the one architectural mode, STEP 910, as described, for instance, with reference to FIGS. 6A-6B. In one example, this executing includes loading the PSW and inverting bit 12. Thereafter, the computing environment is run in the other architectural mode (e.g., z/Architecture), STEP 912.

Figure 10:
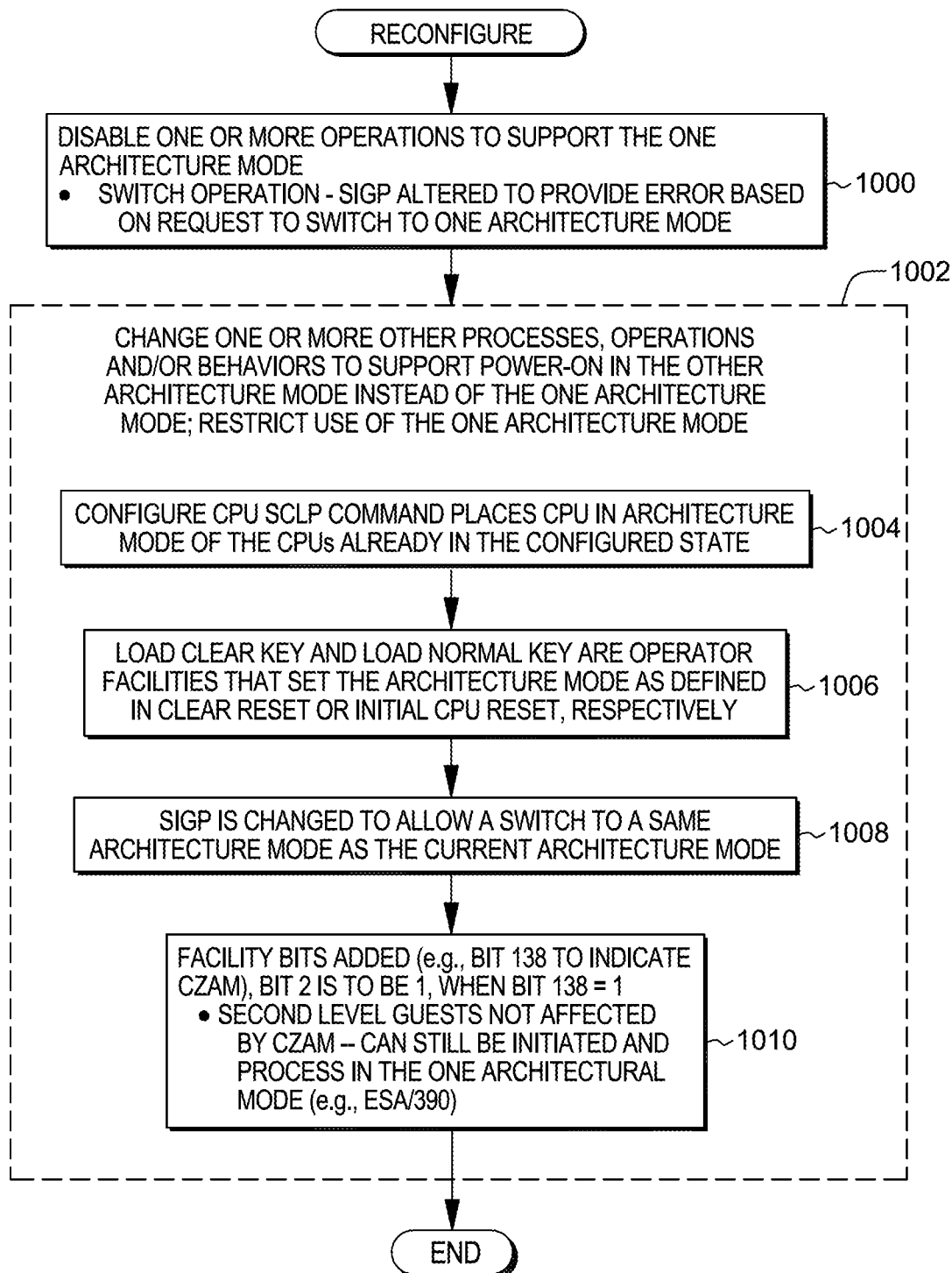
FIG. 10 depicts further changes to be made in reconfiguring a computing environment.

In a further embodiment, referring to FIG. 10, the reconfiguring includes disabling one or more operations that support the one architectural mode, including disabling the switch operation, STEP 1000. For instance, the Signal Processor instruction is altered to provide an error based on a request to switch back to the one architectural mode, e.g., ESA/390.

Further, one or more other processes, operations and/or behaviors are changed to support power-on in the other architectural mode, instead of the one architectural mode and use of the one architectural mode is restricted, STEP 1002. These one or more other processes include, for instance, the configure CPU SCLP command that places the CPU in the architectural mode of the CPUs already in the configured state 1004; the load-clear key and load-normal key, which are operator facilities that set the architecture mode as defined in clear reset or initial CPU reset, respectively 1006; the Signal Processor instruction that is changed to accept a switch from an architectural mode to the same architectural mode, such that status is provided and not treated as an error 1008; and facility bits are added to the facility indicators to indicate the configuration architectural mode facility 1010.

Figure 11:
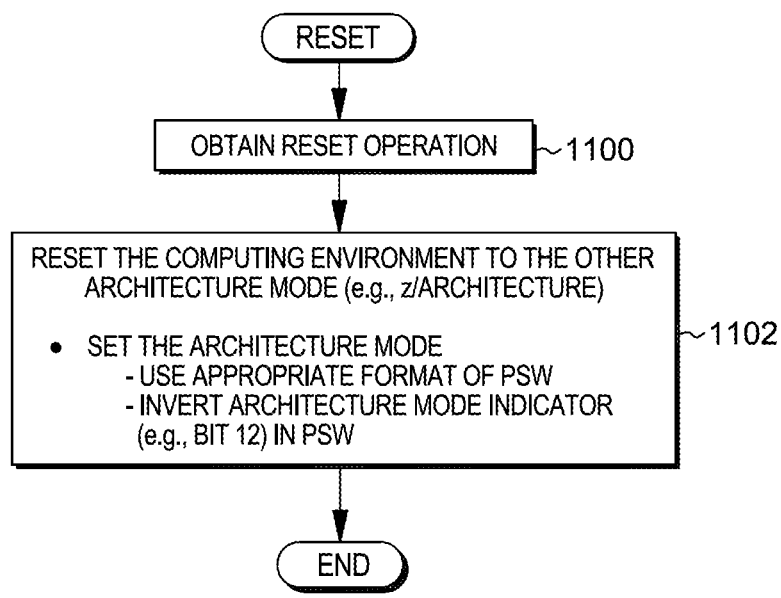
FIG. 11 depicts one embodiment of the logic to reset a computing environment.

As described herein, another operation that is affected by installation of the configuration architectural mode facility is the reset operation. One embodiment of processing associated with reset is described with reference to FIG. 11. Initially, a processor obtains (e.g., receives, is provided, or otherwise gets) a reset operation, STEP 1100, and the reset operation is performed to reset the computing environment to the other architectural mode (e.g., z/Architecture), STEP 1102, as described herein. This includes, for instance, using a PSW that is in the appropriate format for the architecture and setting bit 12 in the PSW to zero.

Described in detail herein is a configuration architectural mode facility that restricts use of certain architectural aspects of an architecture supported by a computing environment configured for a plurality of architectures. In one example, a configuration architectural mode facility is installed, and a computing environment that supports multiple architectural configurations can be re-configured such that aspects of one of the architectural modes (e.g., the legacy mode) are no longer supported, but another architectural mode (e.g., an enhanced architectural mode) remains supported. When a computing environment is so configured, the computing environment is prevented from being reconfigured back to the unsupported architectural mode.

In a further embodiment, a computing environment is dynamically configured in a selected architectural mode, such as z/Architecture. In this embodiment, a check may not be made as to whether a CZAM facility is installed, and/or an explicit SIGP Set Architecture order may not be performed. One embodiment of the logic to perform this configuration is described with reference to FIG. 12.

Figure 12:
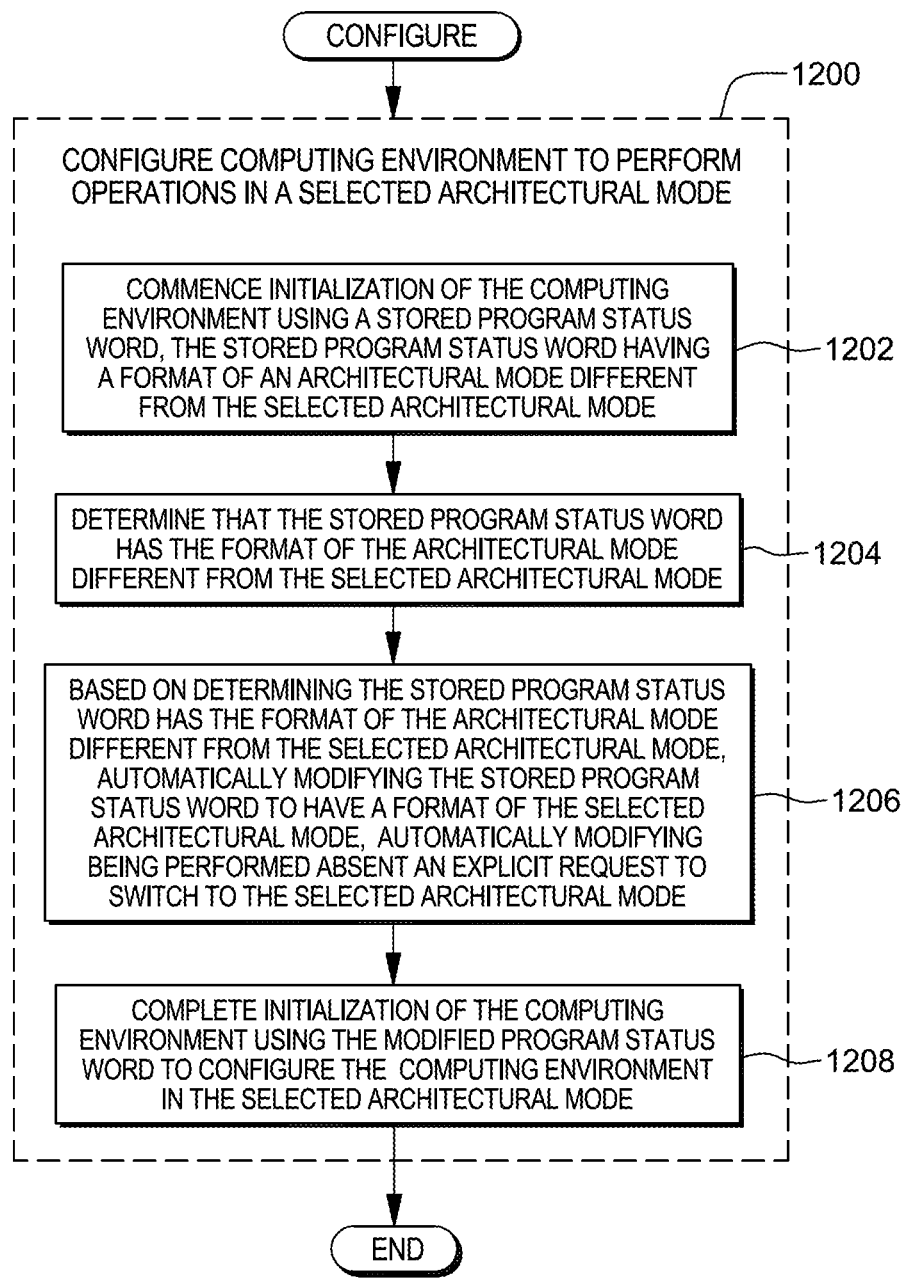
FIG. 12 depicts one embodiment of logic to configure a computing environment.

Referring to FIG. 12, in one embodiment, a processor configures a computing environment to perform operations in a selected architectural mode (e.g., z/Architecture), STEP 1200. The configuring includes, for instance, commencing initialization of the computing environment using a stored program status word, STEP 1202. In one example, the stored program status word has a format of an architectural mode different from the selected architectural mode. Thus, a determination is made that the stored program status word has the format of the architectural mode different from the selected architectural mode, STEP 1204. Based on that determination, the stored program status word is automatically modified to have a format of the selected architectural mode, STEP 1206. The automatically modifying is performed absent an explicit request to switch to the selected architectural mode. Initialization of the computing environment using the modified program status word is then completed to configure the computing environment in the selected architectural mode, STEP 1208.

In one embodiment, the CZAM facility may be used with one or more other facilities including, for instance, a No-DAT facility and/or a control utility boot facility, described in the following co-filed, commonly assigned applications entitled "Managing Processing Associated with Selected Architectural Facilities," Gainey, et al., (IBM Docket No.: POU920140020US1); and "Common Boot Sequence for Control Utility Able to be Initialized in Multiple Architectures," Michael K. Gschwind, (IBM Docket No.: POU920140019US1), respectively, each of which is hereby incorporated by reference herein in its entirety.

Figure 13:
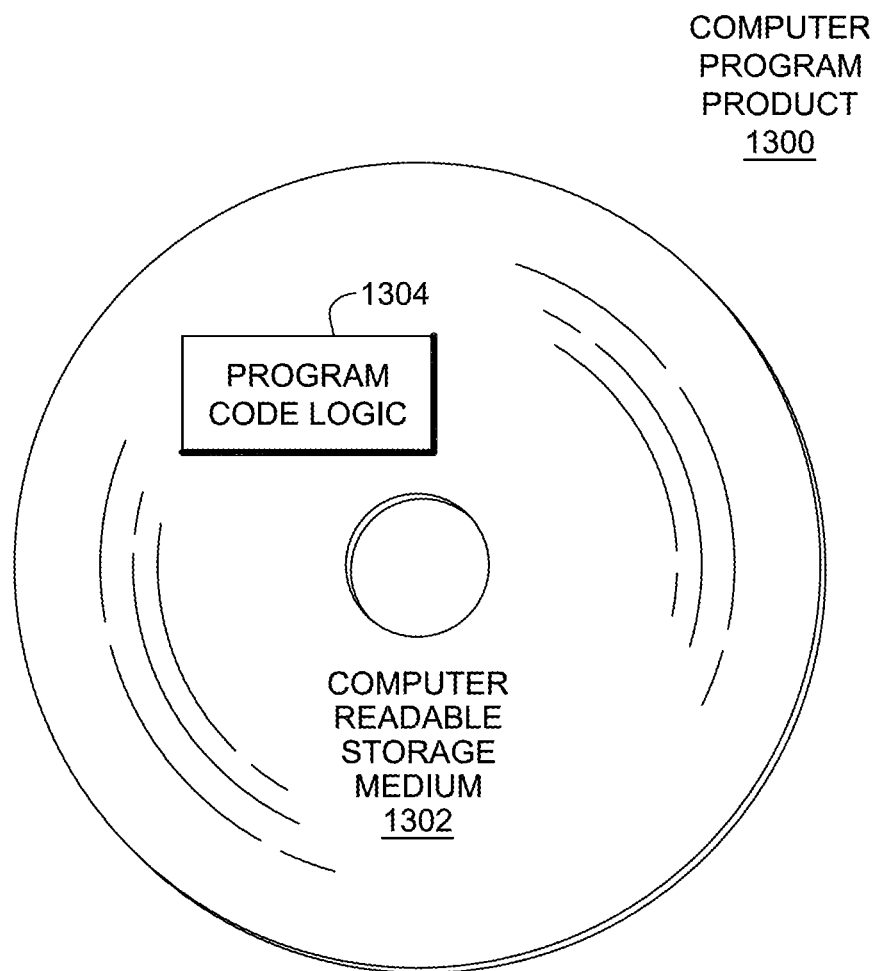
FIG. 13 depicts one embodiment of a computer program product.

Referring to FIG. 13, in one example, a computer program product 1300 includes, for instance, one or more non-transitory computer readable storage media 1302 to store computer readable program code means, logic and/or instructions 1304 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Yet further, other types of processes, operations and/or behaviors may be affected by installation of a CAM. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 14:
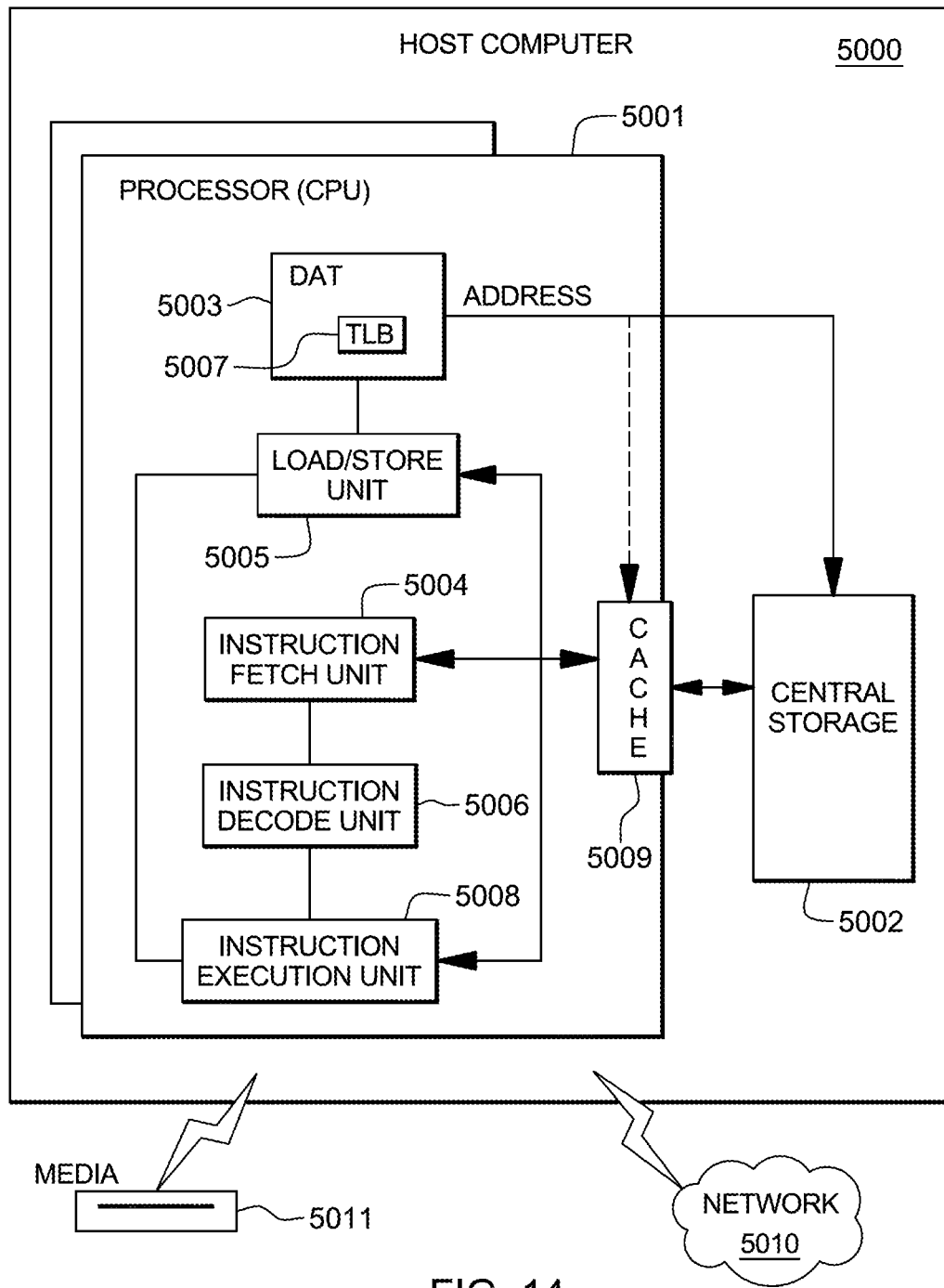
FIG. 14 depicts one embodiment of a host computer system.

Referring to FIG. 14, representative components of a Host Computer system 5000 to implement one or more embodiments are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have access register translation (ART) 5012, which includes an ART lookaside buffer (ALB) 5013, for selecting an address space to be used by dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses.

In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture, bits are numbered in a left-to-right sequence. In the z/Architecture, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture). The bits in an address may be numbered 8-31 or 40-63 for 24-bit addresses, or 1-31 or 33-63 for 31-bit addresses; they are numbered 0-63 for 64-bit addresses. In one example, bits 8-31 and 1-31 apply to addresses that are in a location (e.g., register) that is 32 bits wide, whereas bits 40-63 and 33-63 apply to addresses that are in a 64-bit wide location. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, 16, and 32 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. An octoword is a group of 32 consecutive bytes on a 32-byte boundary. When storage addresses designate halfwords, words, doublewords, quadwords, and octowords, the binary representation of the address contains one, two, three, four, or five rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one example, the embodiment may be practiced by software (sometimes referred to licensed internal code, firmware, micro-code, milli-code, pico-code and the like, any of which would be consistent with one or more embodiments). Referring to FIG. 14, software program code which embodies one or more aspects may be accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 15:
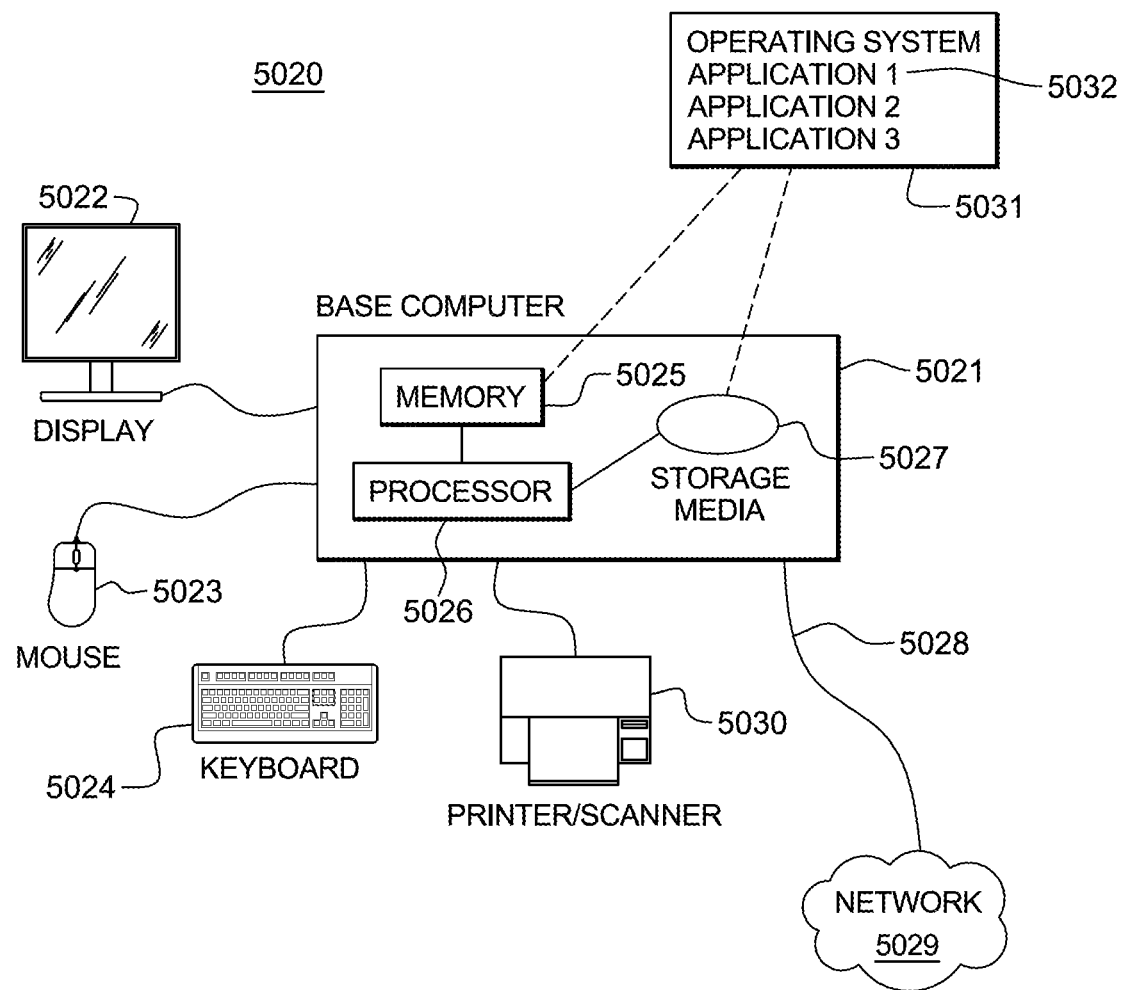
FIG. 15 depicts a further example of a computer system.

FIG. 15 illustrates a representative workstation or server hardware system in which one or more embodiments may be practiced. The system 5020 of FIG. 15 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 16:
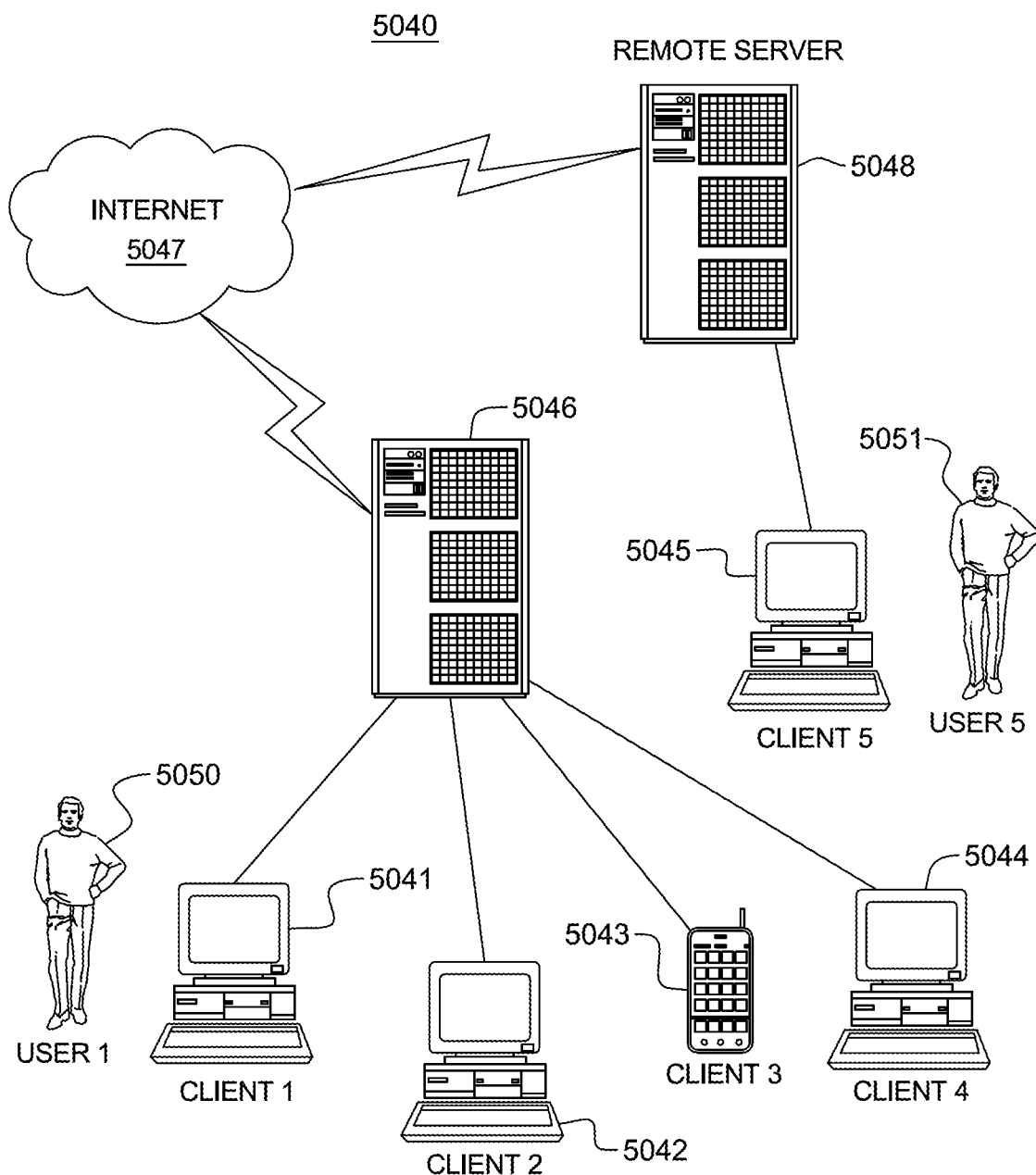
FIG. 16 depicts another example of a computer system comprising a computer network.

FIG. 16 illustrates a data processing network 5040 in which one or more embodiments may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 16, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing an IBM eServer System z server available from International Business Machines Corporation.

Referring concurrently to FIG. 15 and FIG. 16, software programming code 5031 which may embody one or more aspects may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 17:
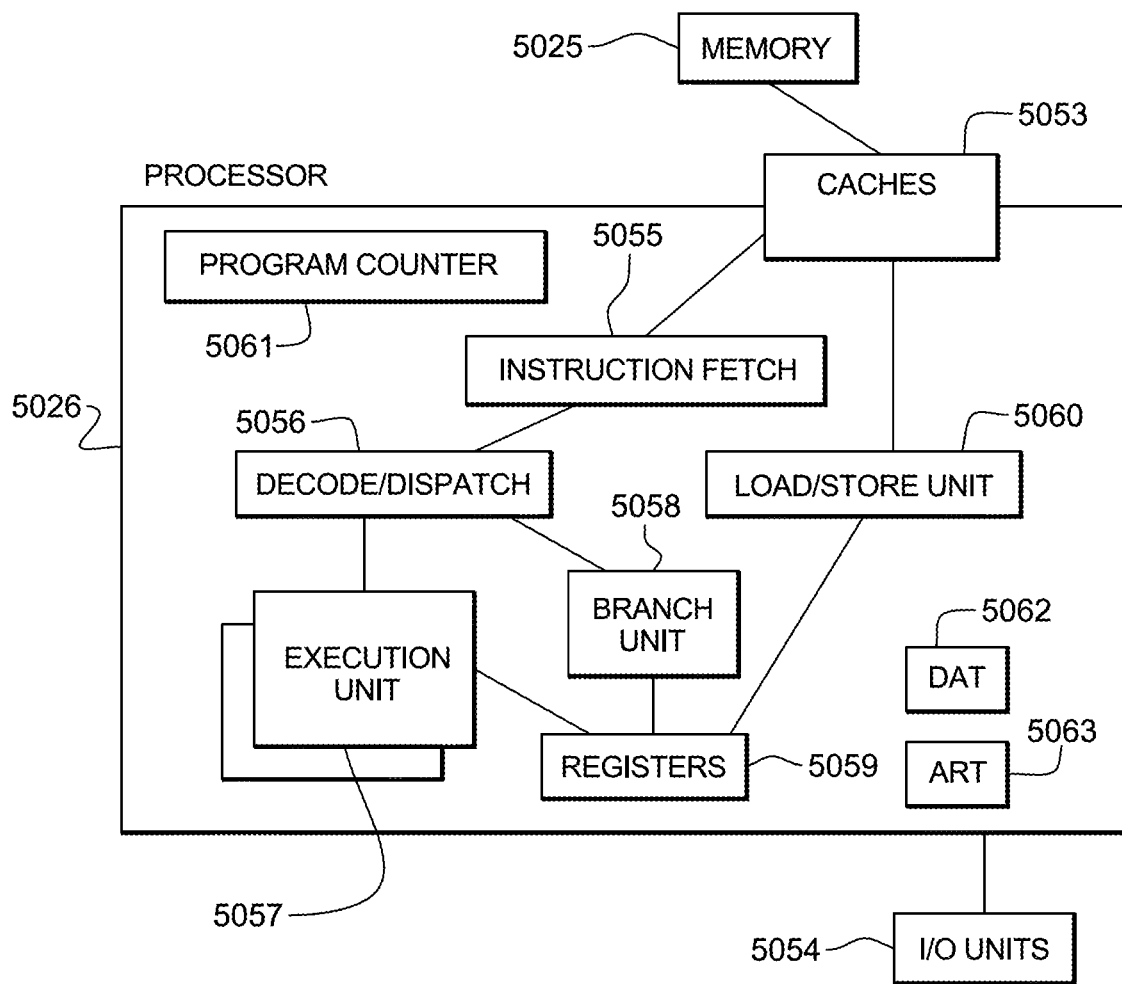
FIG. 17 depicts one embodiment of various elements of a computer system.

Referring to FIG. 17, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture are CISC instructions having a length of 2, 4 or 6 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Virtual addresses are transformed into real addresses using dynamic address translation 5062 and, optionally, using access register translation 5063.

Figure 18A:
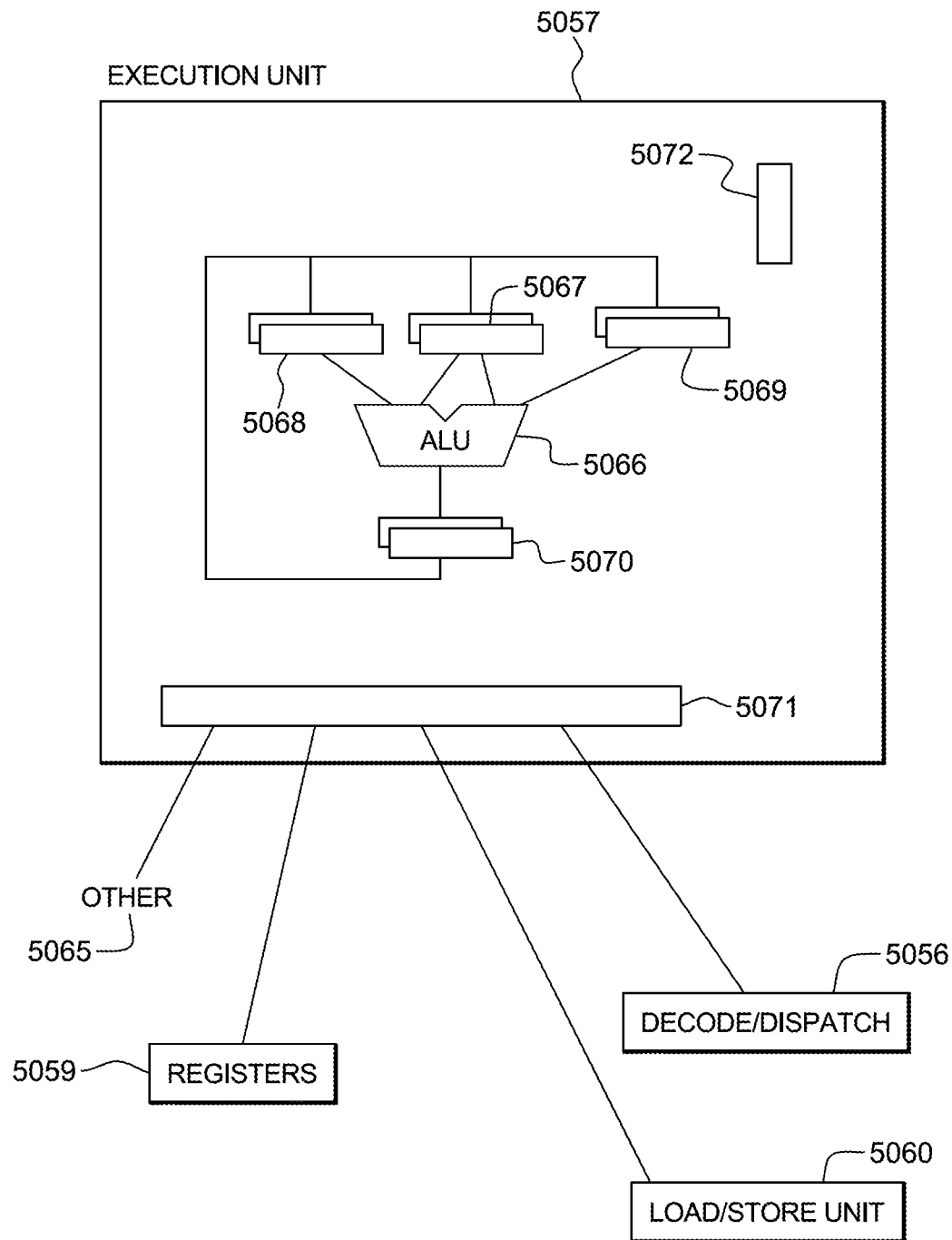
FIG. 18A depicts one embodiment of the execution unit of the computer system of FIG. 17.

A processor 5026 typically has one or more units 5057, 5058, 5060 for executing the function of the instruction. Referring to FIG. 18A, an execution unit 5057 may communicate 5071 with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 18B:
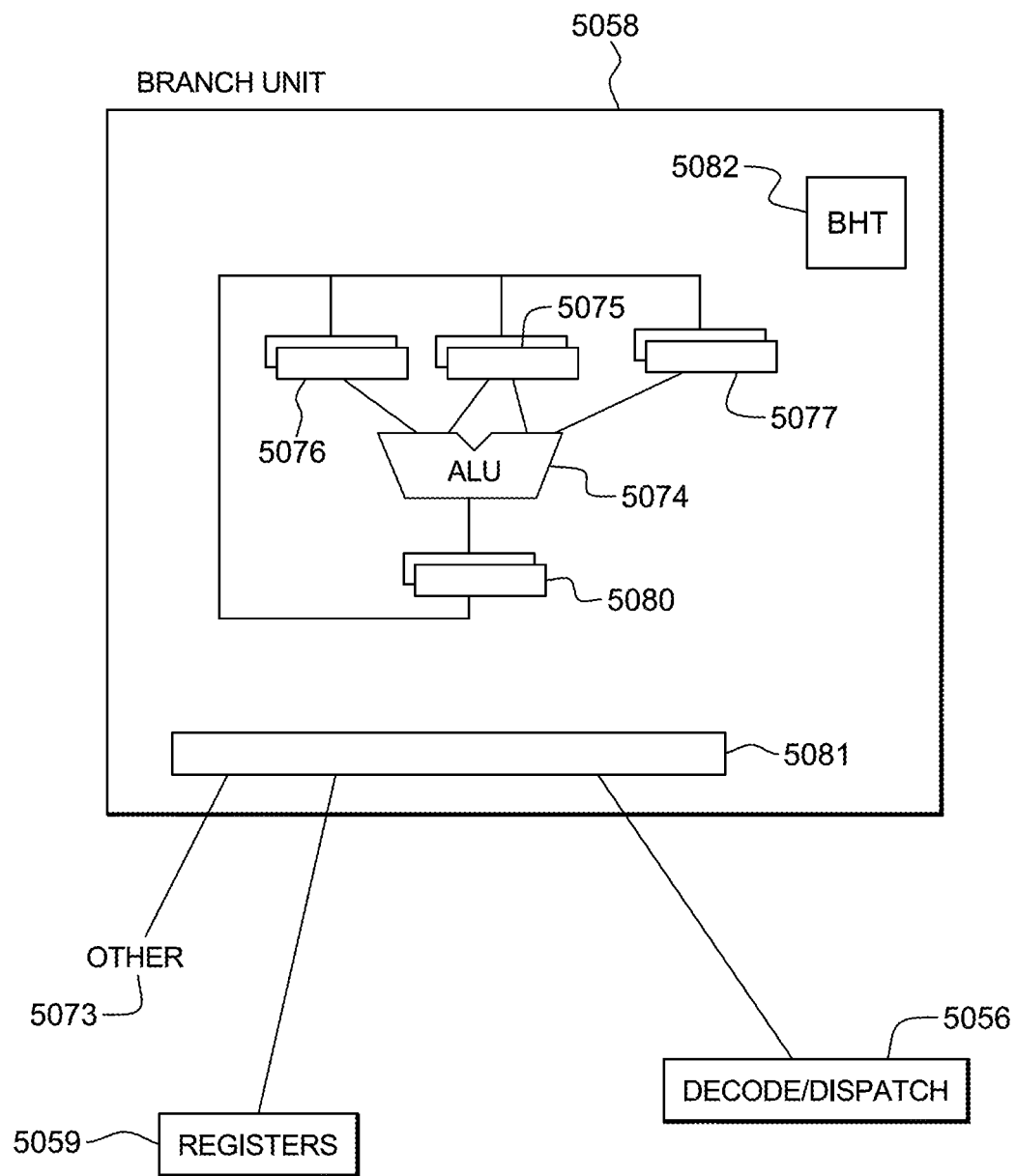
FIG. 18B depicts one embodiment of the branch unit of the computer system of FIG. 17.

Referring to FIG. 18B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate 5081 with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture long displacement facility wherein the instruction defines a base register, an index register and an immediate field (displacement field) that are added together to provide the address of the operand in memory for example. Location herein typically implies a location in main memory (main storage) unless otherwise indicated.

Figure 18C:
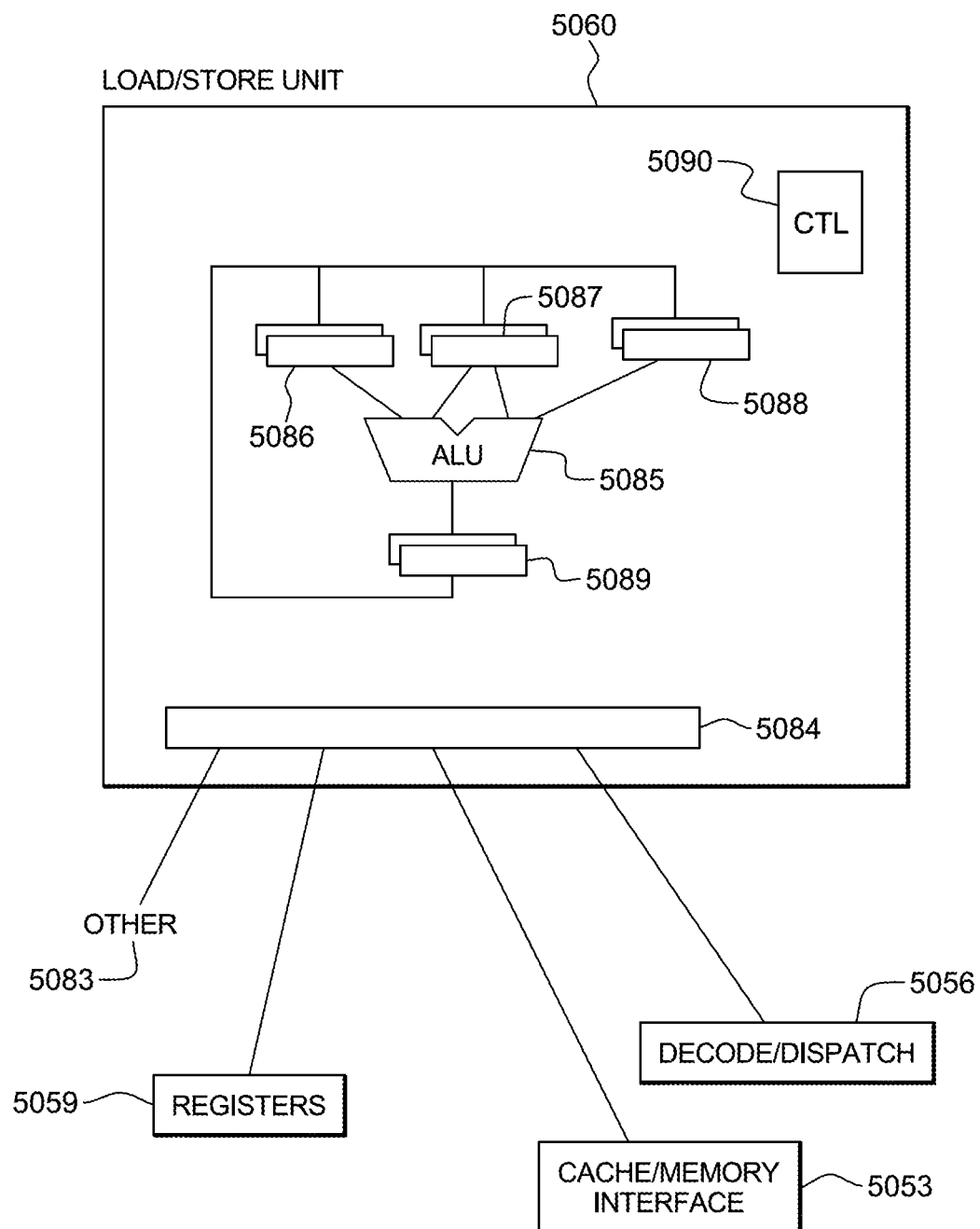
FIG. 18C depicts one embodiment of the load/store unit of the computer system of FIG. 17.

Referring to FIG. 18C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate 5084 with general registers 5059, decode/dispatch unit 5056, cache/memory interface 5053 or other elements 5083 and comprises various register circuits 5086, 5087, 5088 and 5089, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 17) provide the processor with means for attaching to peripheral devices including tape, disc, printers, displays, and networks for example. I/O units are often presented to the computer program by software drivers. In mainframes, such as the System z from IBM, channel adapters and open system adapters are I/O units of the mainframe that provide the communications between the operating system and peripheral devices.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more embodiments, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture IBM® Server, or alternatively in machines executing other architectures. They can be emulated in the existing and in future IBM mainframe servers and on other machines of IBM® (e.g., Power Systems servers and System x Servers). They can be executed in machines running Linux on a wide variety of machines using hardware manufactured by IBM °, Intel °, AMD, and others. Besides execution on that hardware under z/Architecture, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated by reference herein in its entirety; and many others, illustrate a variety of known ways to achieve emulation of an instruction format architected for a different machine for a target machine available to those skilled in the art.

Figure 19:
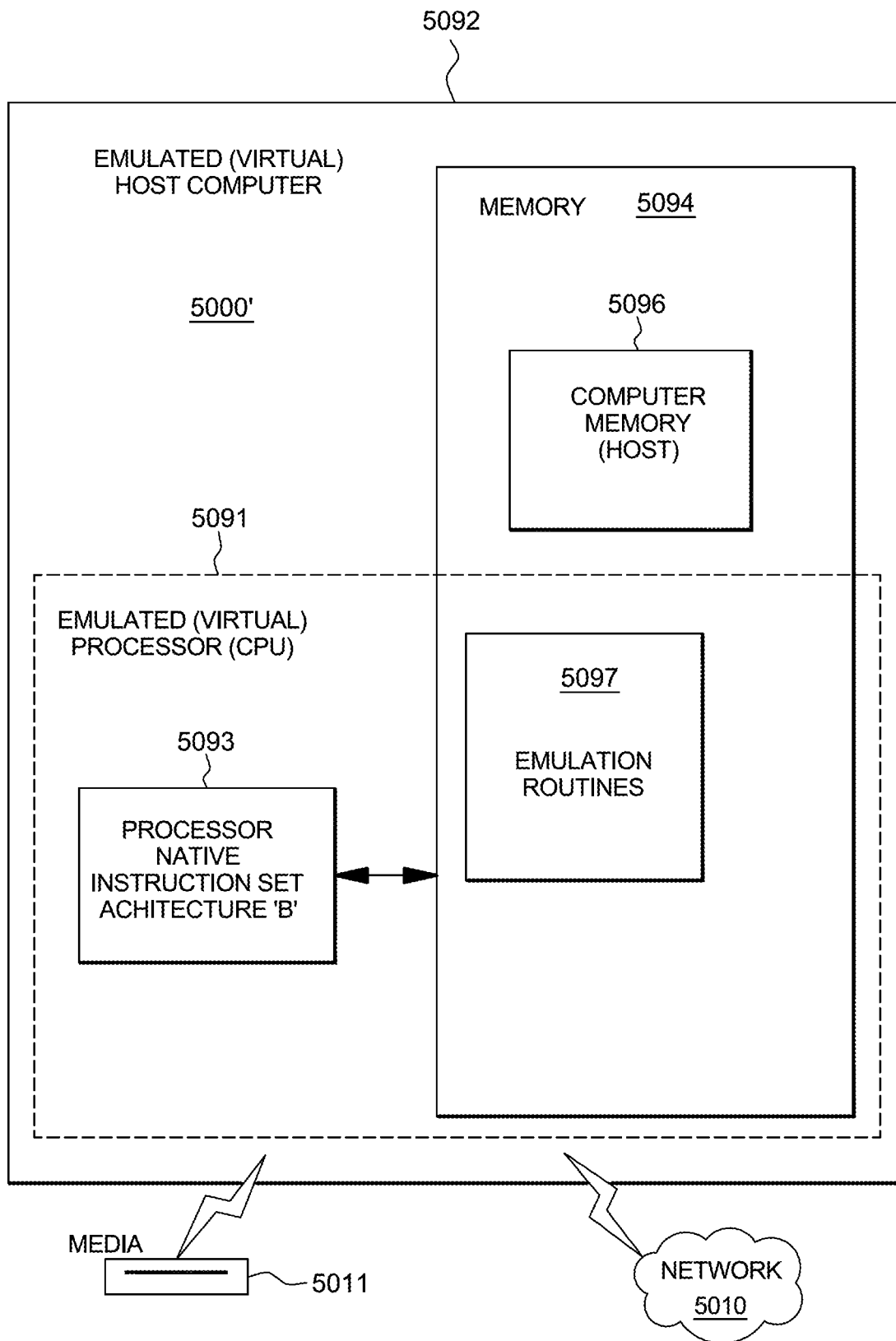
FIG. 19 depicts one embodiment of an emulated host computer system.

In FIG. 19, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines. Special hardware and off-load engines may also be provided to assist the processor 5093 in emulating the function of the host computer 5000'.

In a further embodiment, one or more aspects relate to cloud computing. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 20:
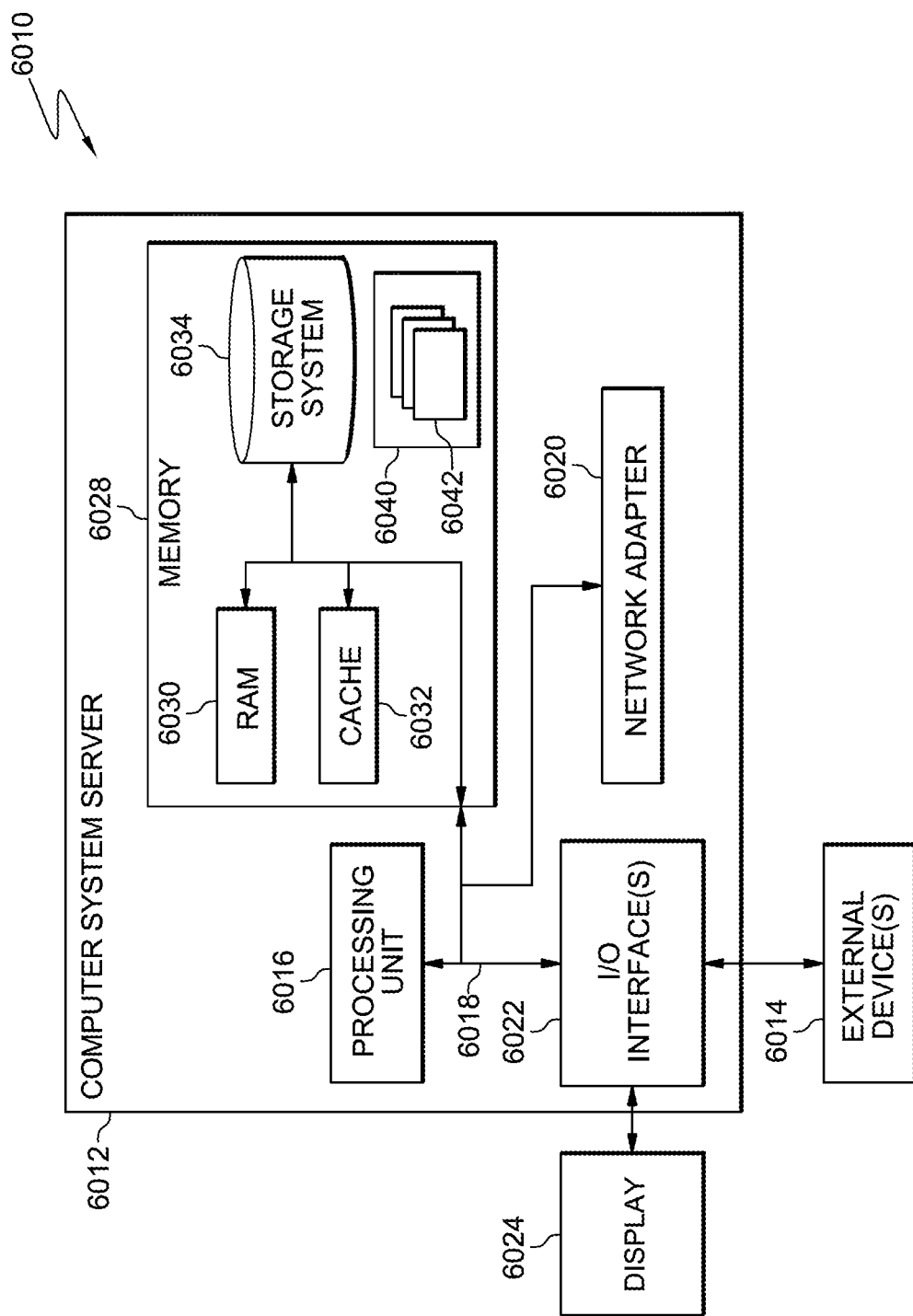
FIG. 20 depicts one embodiment of a cloud computing node.

Referring now to FIG. 20, a schematic of an example of a cloud computing node is shown. Cloud computing node 6010 is only one example of a suitable cloud computing node and is not intended to suggest any limitation as to the scope of use or functionality of embodiments of the invention described herein. Regardless, cloud computing node 6010 is capable of being implemented and/or performing any of the functionality set forth hereinabove.

In cloud computing node 6010 there is a computer system/server 6012, which is operational with numerous other general purpose or special purpose computing system environments or configurations. Examples of well-known computing systems, environments, and/or configurations that may be suitable for use with computer system/server 6012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 6012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 6012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 20, computer system/server 6012 in cloud computing node 6010 is shown in the form of a general-purpose computing device. The components of computer system/server 6012 may include, but are not limited to, one or more processors or processing units 6016, a system memory 6028, and a bus 6018 that couples various system components including system memory 6028 to processor 6016.

Bus 6018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 6012 typically includes a variety of computer system readable media. Such media may be any available media that is accessible by computer system/server 6012, and it includes both volatile and non-volatile media, removable and non-removable media.

System memory 6028 can include computer system readable media in the form of volatile memory, such as random access memory (RAM) 6030 and/or cache memory 6032. Computer system/server 6012 may further include other removable/non-removable, volatile/non-volatile computer system storage media. By way of example only, storage system 6034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 6018 by one or more data media interfaces. As will be further depicted and described below, memory 6028 may include at least one program product having a set (e.g., at least one) of program modules that are configured to carry out the functions of embodiments of the invention.

Program/utility 6040, having a set (at least one) of program modules 6042, may be stored in memory 6028 by way of example, and not limitation, as well as an operating system, one or more application programs, other program modules, and program data. Each of the operating system, one or more application programs, other program modules, and program data or some combination thereof, may include an implementation of a networking environment. Program modules 6042 generally carry out the functions and/or methodologies of embodiments of the invention as described herein.

Computer system/server 6012 may also communicate with one or more external devices 6014 such as a keyboard, a pointing device, a display 6024, etc.; one or more devices that enable a user to interact with computer system/server 6012; and/or any devices (e.g., network card, modem, etc.) that enable computer system/server 6012 to communicate with one or more other computing devices. Such communication can occur via Input/Output (I/O) interfaces 6022. Still yet, computer system/server 6012 can communicate with one or more networks such as a local area network (LAN), a general wide area network (WAN), and/or a public network (e.g., the Internet) via network adapter 6020. As depicted, network adapter 6020 communicates with the other components of computer system/server 6012 via bus 6018. It should be understood that although not shown, other hardware and/or software components could be used in conjunction with computer system/server 6012. Examples, include, but are not limited to: microcode, device drivers, redundant processing units, external disk drive arrays, RAID systems, tape drives, and data archival storage systems, etc.

Figure 21:
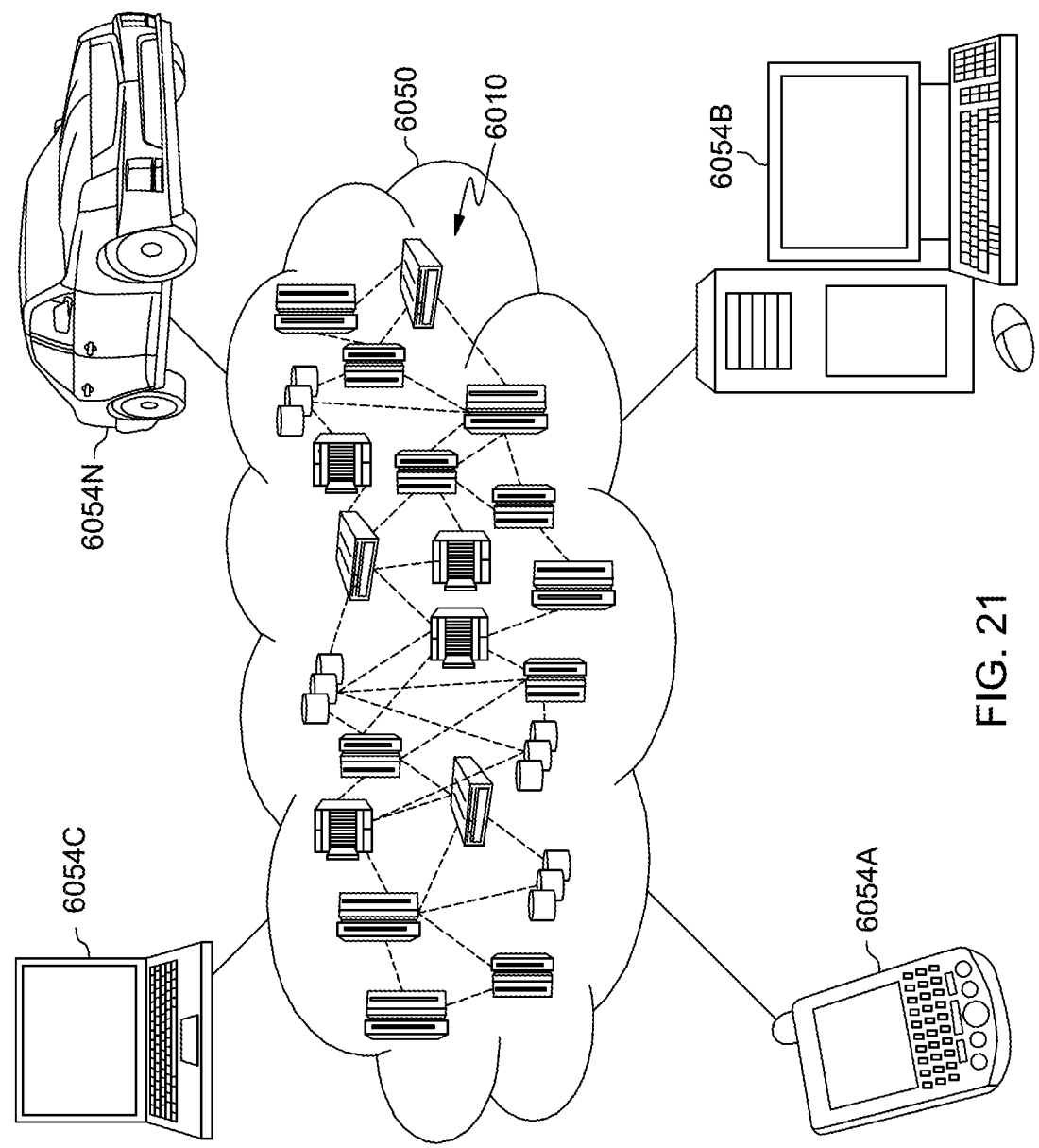
FIG. 21 depicts on embodiment of a cloud computing environment.

Referring now to FIG. 21, illustrative cloud computing environment 6050 is depicted. As shown, cloud computing environment 6050 comprises one or more cloud computing nodes 6010 with which local computing devices used by cloud consumers, such as, for example, personal digital assistant (PDA) or cellular telephone 6054A, desktop computer 6054B, laptop computer 6054C, and/or automobile computer system 6054N may communicate. Nodes 6010 may communicate with one another. They may be grouped (not shown) physically or virtually, in one or more networks, such as Private, Community, Public, or Hybrid clouds as described hereinabove, or a combination thereof. This allows cloud computing environment 6050 to offer infrastructure, platforms and/or software as services for which a cloud consumer does not need to maintain resources on a local computing device. It is understood that the types of computing devices 6054A-N shown in FIG. 21 are intended to be illustrative only and that computing nodes 6010 and cloud computing environment 6050 can communicate with any type of computerized device over any type of network and/or network addressable connection (e.g., using a web browser).

Figure 22:
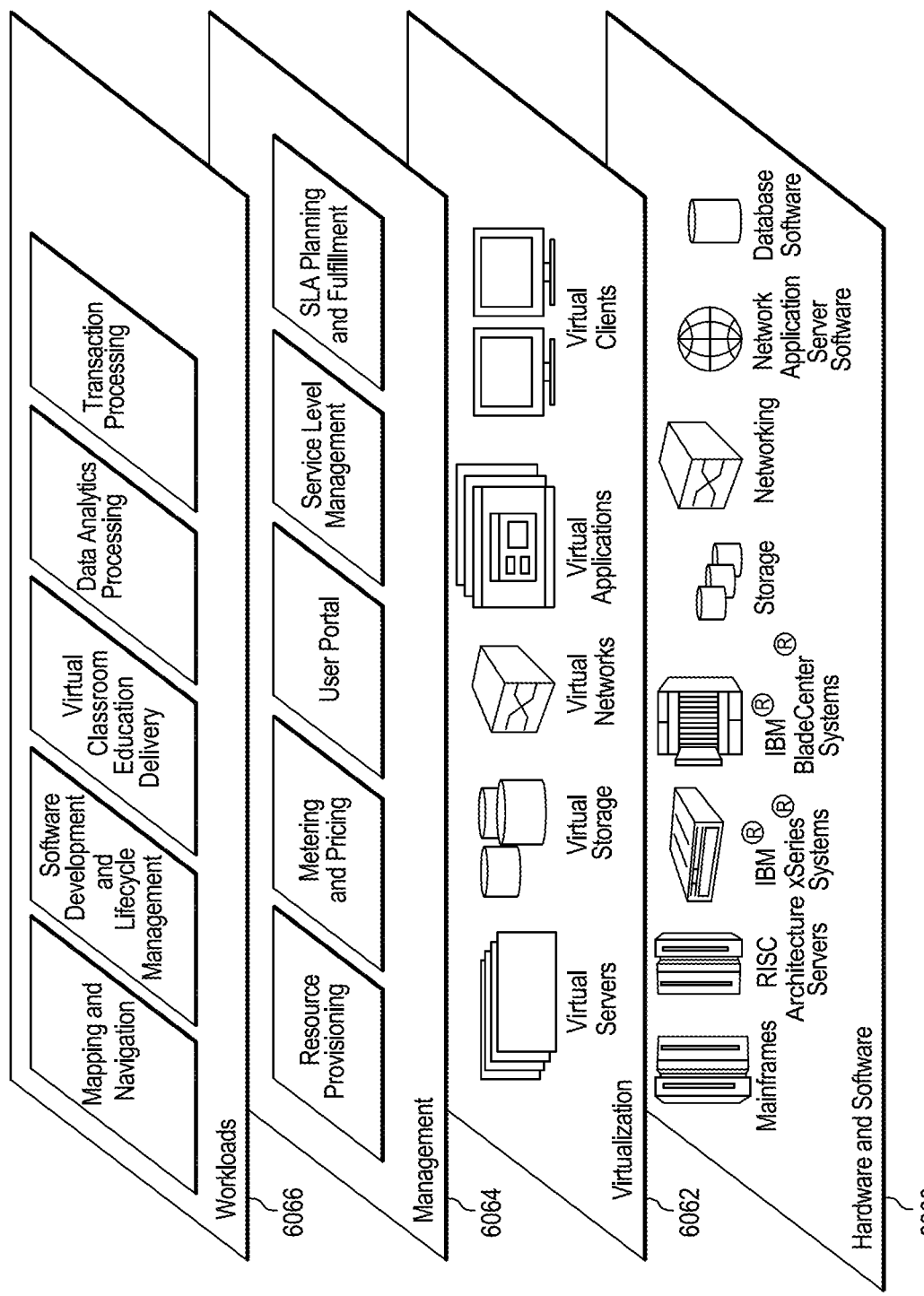
FIG. 22 depicts one example of abstraction model layers.

Referring now to FIG. 22, a set of functional abstraction layers provided by cloud computing environment 6050 (FIG. 21) is shown. It should be understood in advance that the components, layers, and functions shown in FIG. 22 are intended to be illustrative only and embodiments of the invention are not limited thereto. As depicted, the following layers and corresponding functions are provided:

Hardware and software layer 6060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 6062 provides an abstraction layer from which the following examples of virtual entities may be provided: virtual servers; virtual storage; virtual networks, including virtual private networks; virtual applications and operating systems; and virtual clients.

In one example, management layer 6064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 6066 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method of reconfiguring a computing environment, said method comprising:
    determining that a configuration architectural mode facility is installed in a computing environment that is configured for a plurality of architectural modes and has a defined power-on sequence that is to power-on the computing environment in one architectural mode of the plurality of architectural modes, the one architectural mode comprising a first instruction set architecture and having a first set of supported features;
    based on determining that the configuration architectural mode facility is installed, reconfiguring, by a processor, the computing environment to restrict use of the one architectural mode, wherein the reconfiguring comprises:
        selecting a different power-on sequence to power-on the computing environment in another architectural mode of the plurality of architectural modes, wherein the other architectural mode is different from the one architectural mode, and the other architectural mode comprises a second instruction set architecture and having a second set of supported features; and
        executing the different power-on sequence to power-on the computing environment in the other architectural mode in place of the one architectural mode restricting use of the one architectural mode, wherein the executing the different power-on sequence comprises creating a new program status word to control operations of the computing environment in the other architectural mode, the creating the new program status word comprising forming the new program status word to have a format indicated be the other architectural mode.

2. The method of claim 1, wherein the creating the new program status word comprises inverting an architectural mode indicator in the new program status word to indicate the other architectural mode.

3. The method of claim 1, wherein the determining that the configuration architectural mode facility is installed comprises checking a facility indicator.

4. The method of claim 1, wherein the reconfiguring further comprises disabling within the computing environment one or more operations to support the one architectural mode, the one or more operations comprising a switch operation to switch from the other architectural mode to the one architectural mode, wherein a switch back to the one architectural mode is disabled.

5. The method of claim 4, wherein the disabling comprises altering processing of a signal processor instruction to provide an error based on a request to switch back to the one architectural mode.

6. The method of claim 1, further comprising performing a reset of at least one processor of the computing environment, wherein the performing the reset comprises:
    resetting the computing environment in the other architectural mode, the resetting comprising setting an architectural mode of the computing environment to the other architectural mode; and
    inverting an architectural mode indicator in a program status word to indicate the other architectural mode.

7. The method of claim 1, wherein the reconfiguring comprises changing processing of a signal processor operation, wherein a signal processor operation to set an architectural mode of the computing environment to the architectural mode it is currently in results in storing status indicating the computing environment is currently in the architectural mode, this status being treated as acceptable by an issuer of the signal processor operation.

8. The method of claim 1, wherein the one architectural mode is a legacy mode and the other architectural mode is an enhanced mode, and wherein the first set of supported features comprise 31-bit addressing and use of 32-bit general purpose registers, and the second set of supported features comprises 64-bit addressing and use of 64-bit general purpose registers.

9. The method of claim 1, wherein the computing environment is a virtual guest environment having a host processor, a first guest virtual machine at a first level of virtualization, and a second guest virtual machine at a second level of virtualization, and wherein the reconfiguring is performed for the host processor and the first guest virtual machine, but not for the second guest virtual machine, the second guest virtual machine being initiated and processing in the one architectural mode.

\* \* \* \* \*